United States Patent [19]

Inoue et al.

[11] Patent Number: 5,161,139
[45] Date of Patent: Nov. 3, 1992

[54] FOCUSING ERROR DETECTING APPARATUS

[75] Inventors: Akino Inoue, Kawasaki; Isao Hoshino, Yokohama, both of Japan

[73] Assignee: Kabushiki Kaisha Toshiba, Kawasaki, Japan

[21] Appl. No.: 461,035

[22] Filed: Jan. 4, 1990

[30] Foreign Application Priority Data

Jan. 6, 1989 [JP] Japan ...................................... 64-933

[51] Int. Cl.⁵ .............................................. G11B 7/00
[52] U.S. Cl. ............................. 369/44.23; 369/44.24; 369/44.42; 369/112; 250/201.5
[58] Field of Search ............... 369/44.12, 44.41, 44.42, 369/44.23, 44.24, 44.37, 112; 250/201.2, 201.5

[56] References Cited

U.S. PATENT DOCUMENTS

| | | | |
|---|---|---|---|
| 4,023,033 | 5/1977 | Bricot et al. | 250/201 |
| 4,513,408 | 4/1985 | Nomura et al. | 369/44.42 |
| 4,712,205 | 12/1987 | Smid et al. | 369/44.12 |
| 4,835,378 | 5/1989 | Coops | 250/201.5 |
| 4,904,856 | 2/1990 | Nagahama et al. | 250/201.5 |
| 4,929,823 | 5/1990 | Kato et al. | 250/201.5 |

FOREIGN PATENT DOCUMENTS

| | | |
|---|---|---|
| 57-103008 | 6/1982 | Japan . |
| 57-103009 | 6/1982 | Japan . |
| 57-105831 | 7/1982 | Japan . |
| 57-105832 | 7/1982 | Japan . |
| 58-220249 | 12/1983 | Japan . |

*Primary Examiner*—Roy N. Envall, Jr.
*Assistant Examiner*—Jennifer L. Hazard
*Attorney, Agent, or Firm*—Oblon, Spivak, McClelland, Maier & Neustadt

[57] ABSTRACT

In an apparatus for detecting a focusing error of an objective lens, a light beam reflected from an optical disk passes the objective lens and is reflected from a beam splitter. The reflected light beam is incident on a cylindrical lens so that the light beam is converged in one direction by the cylindrical lens. The converged light beam is incident on first and second triangular prisms so that it is divided into two beams and the two beams are guided into different directions and form beam spots on photo-detectors, respectively. In the respective triangular prism, light rays of the light beam pass through different optical paths. Thus, an aberration is applied to the light beam from the prisms. Accordingly, the shape of each beam spot on the photo-detector is changed in accordance with a focusing error.

50 Claims, 18 Drawing Sheets

DEFOCUSING STATE WHEN LENS IS MOVED TOWARD DISK

FOCUSING STATE

DEFOCUSING STATE WHEN LENS IS MOVED AWAY FROM DISK

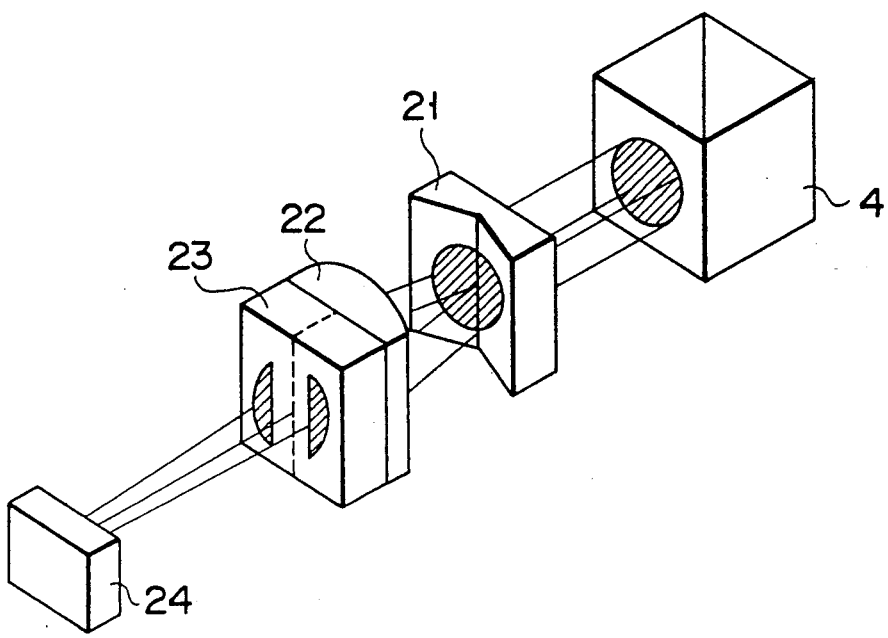
F I G. 8
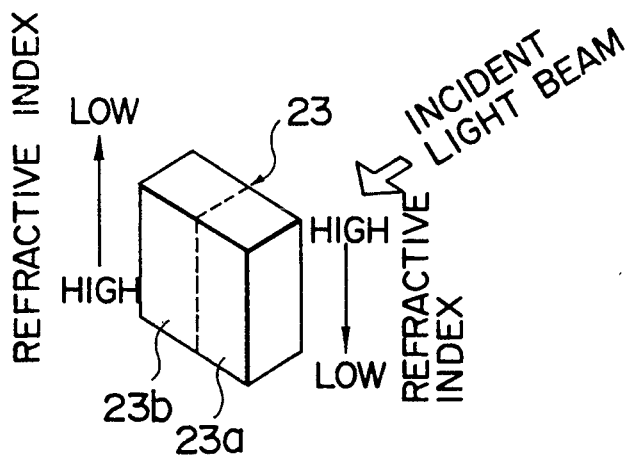
F I G. 9
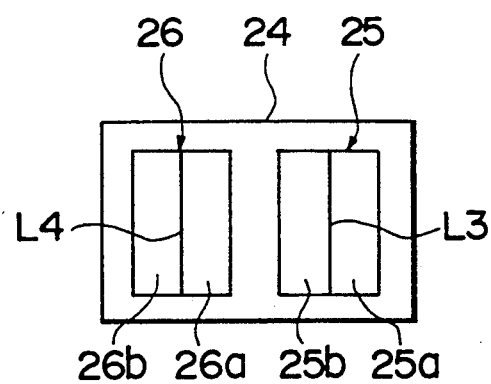
F I G. 10

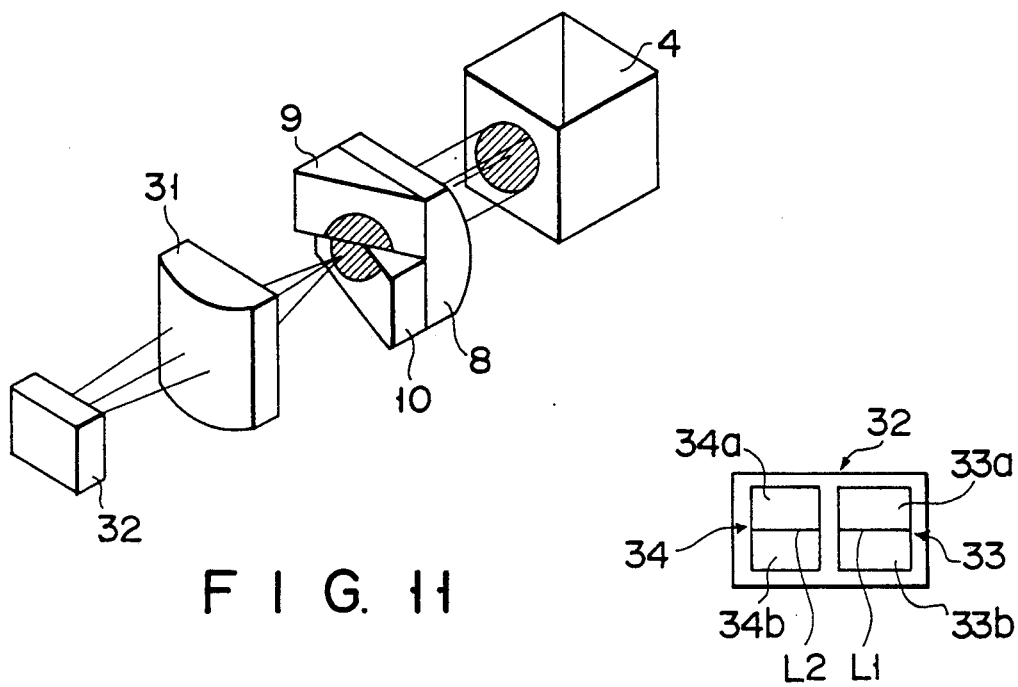
F I G. 11
F I G. 12
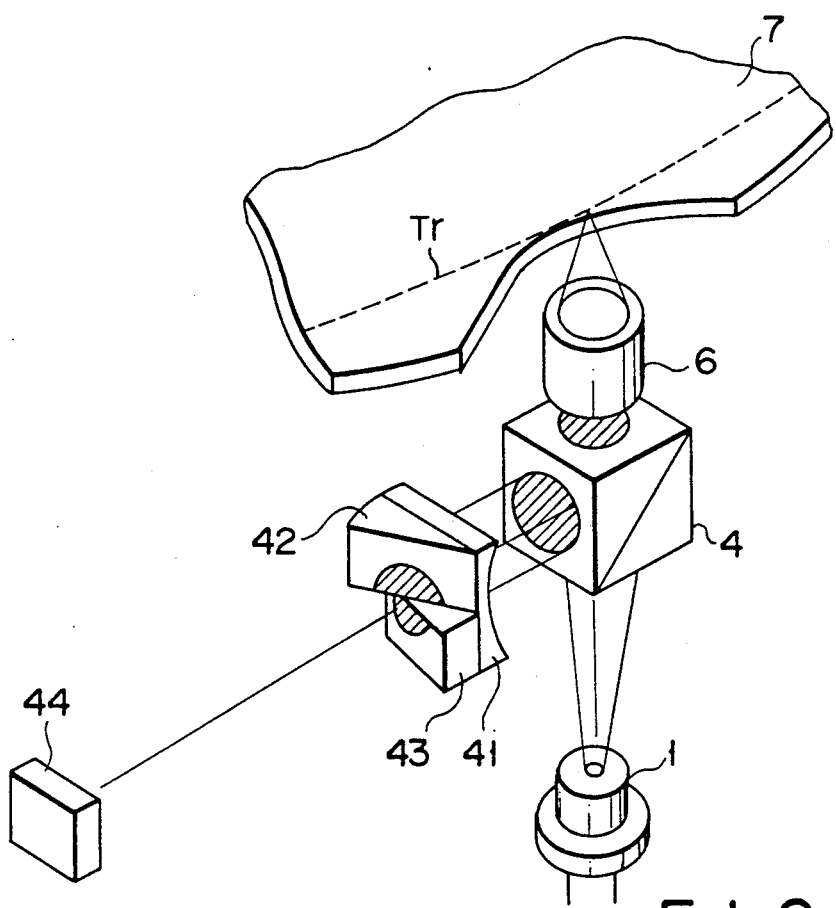
F I G. 13

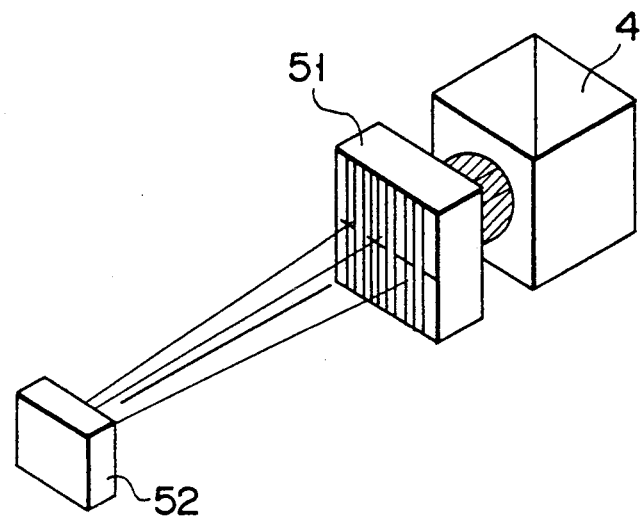
F I G. 14
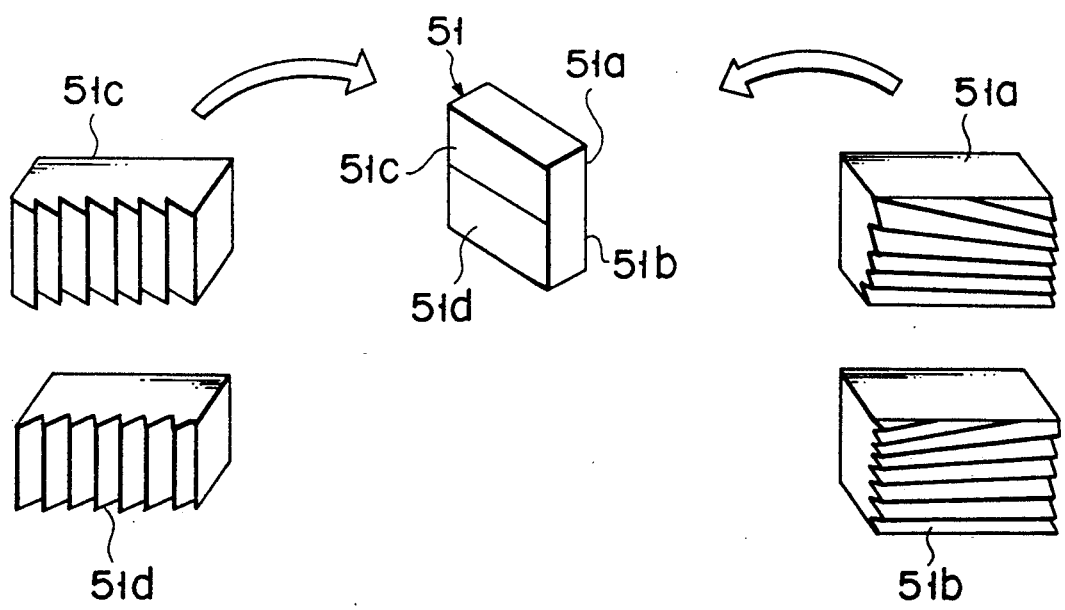
F I G. 15

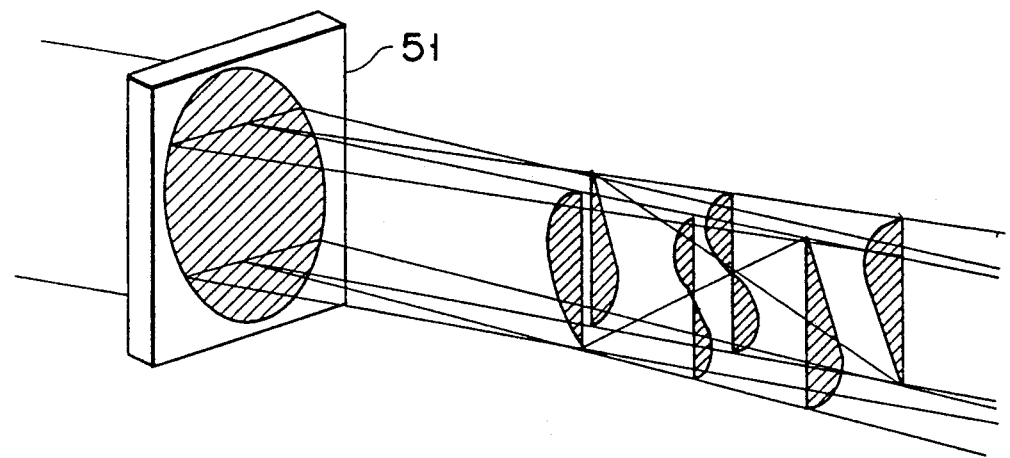
F I G. 16A
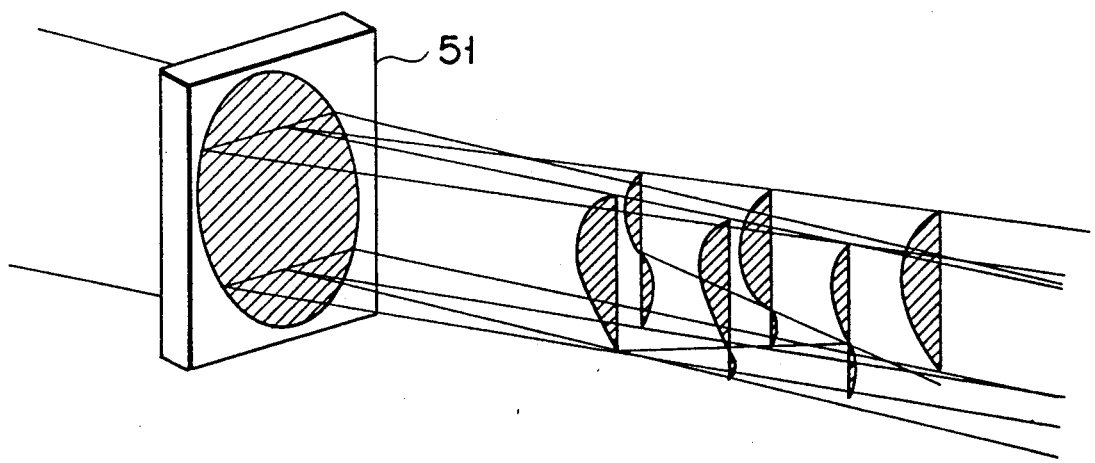
F I G. 16B

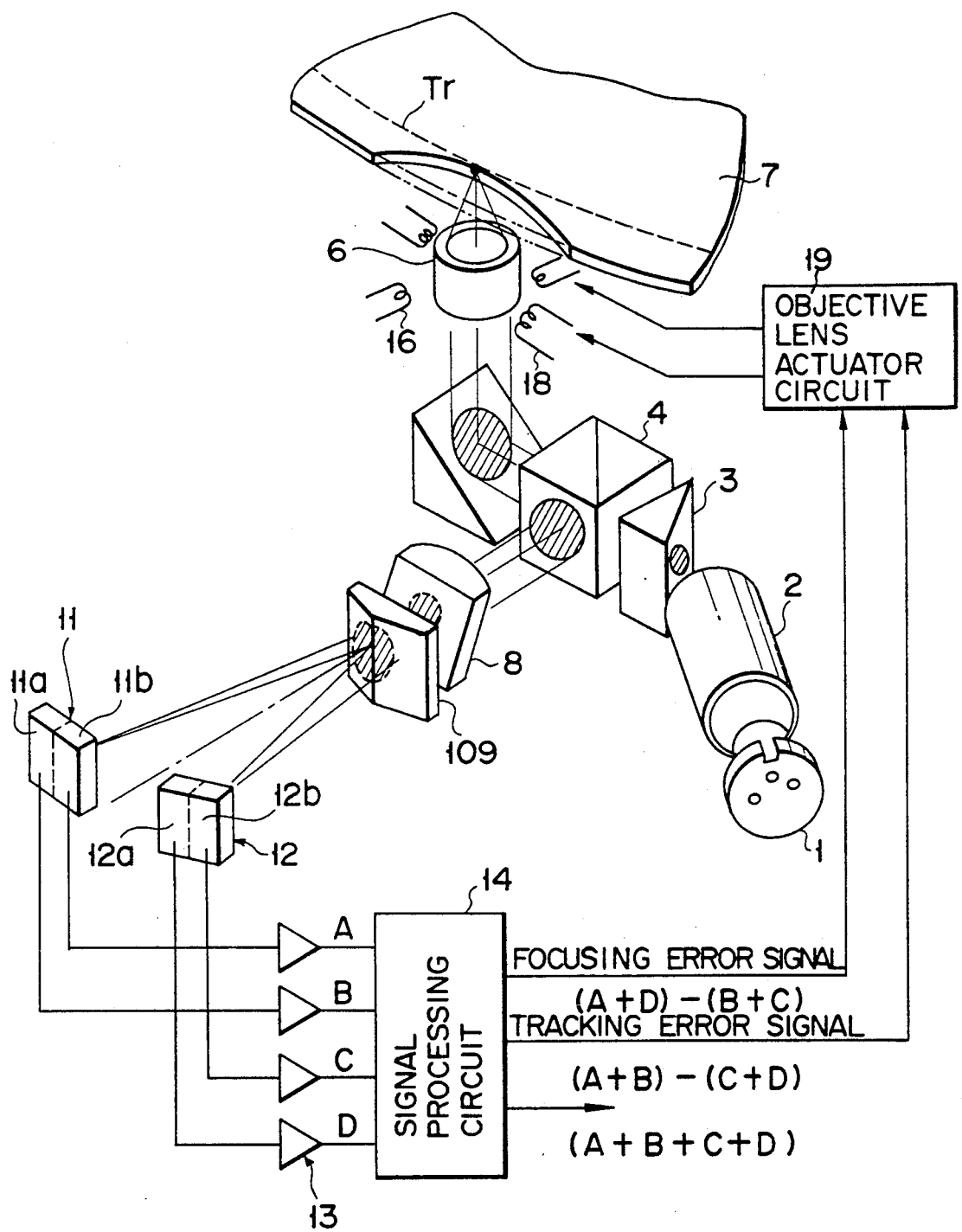
F I G. 17

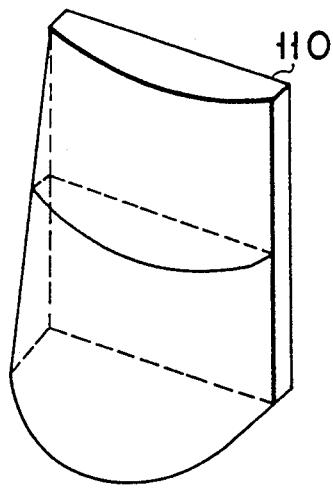
F I G. 18
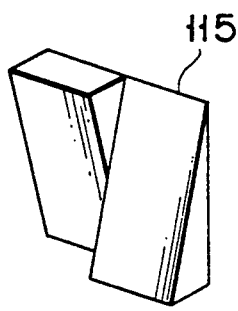
F I G. 19
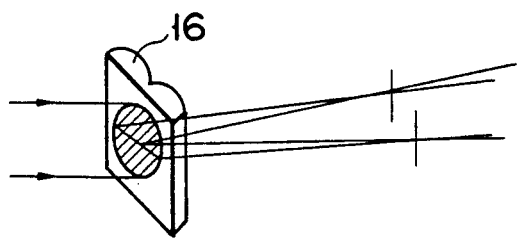
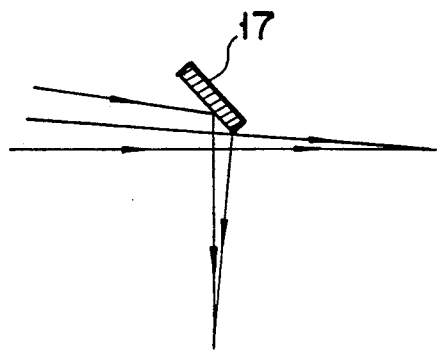
F I G. 20     F I G. 21

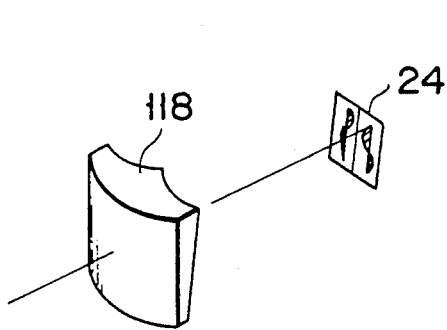
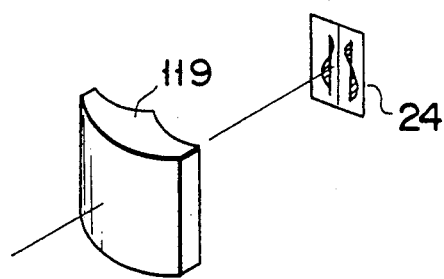
FIG. 23A   FIG. 23B
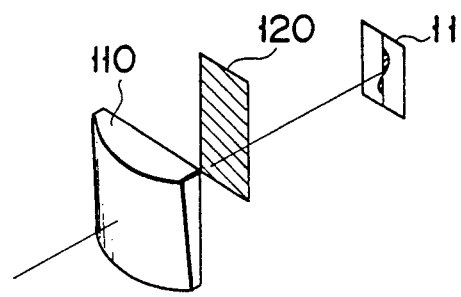
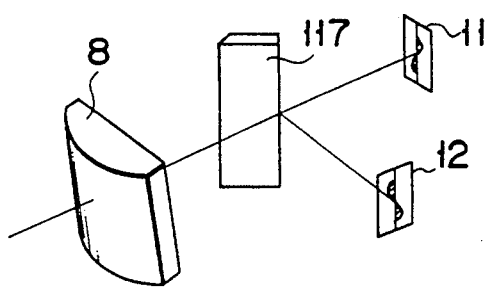
FIG. 24   FIG. 25
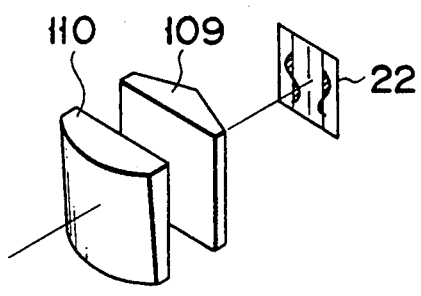
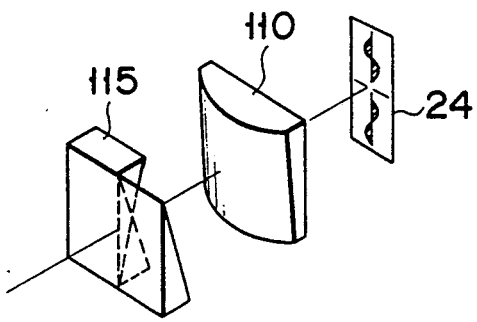
FIG. 26   FIG. 27

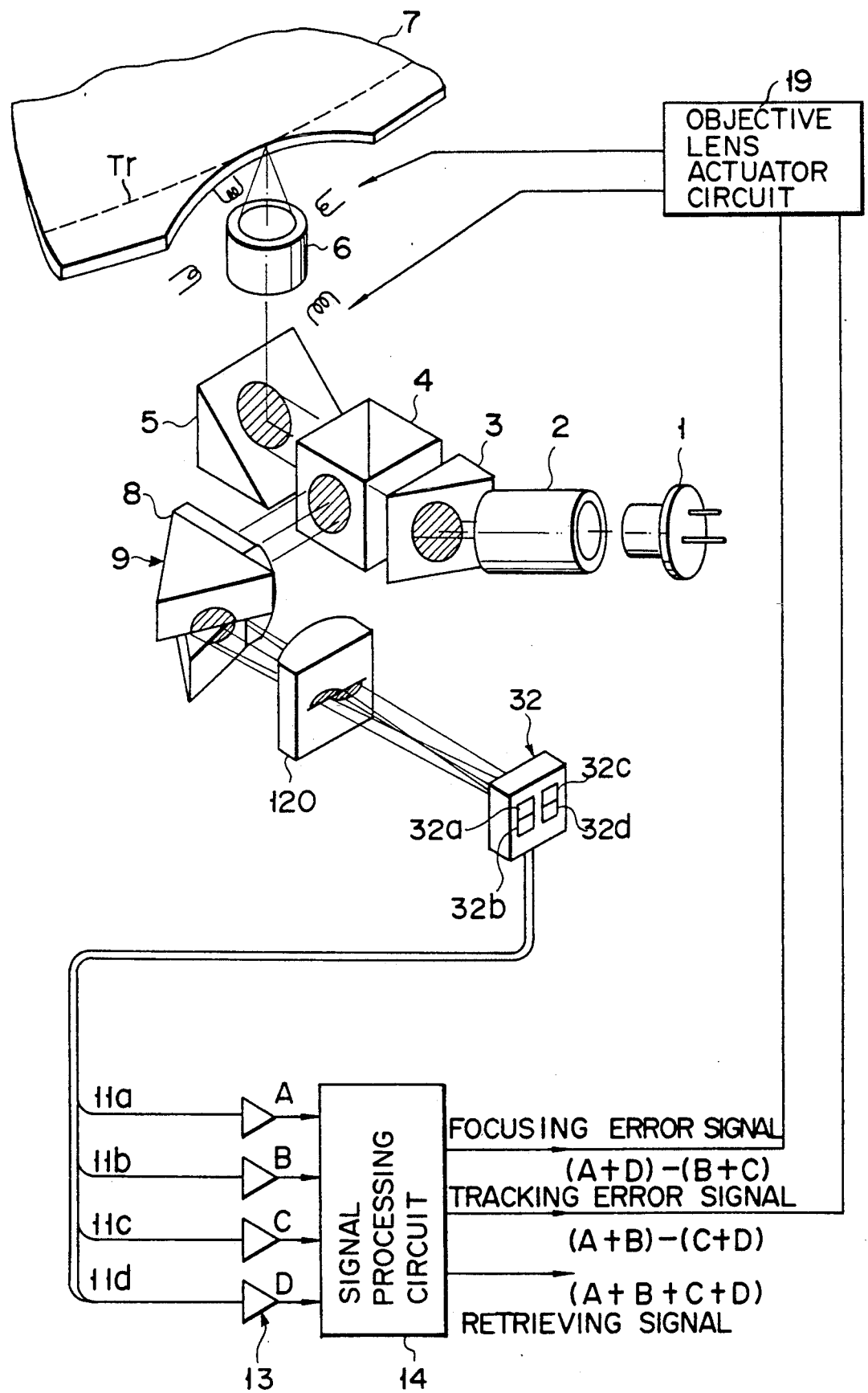
F I G. 28

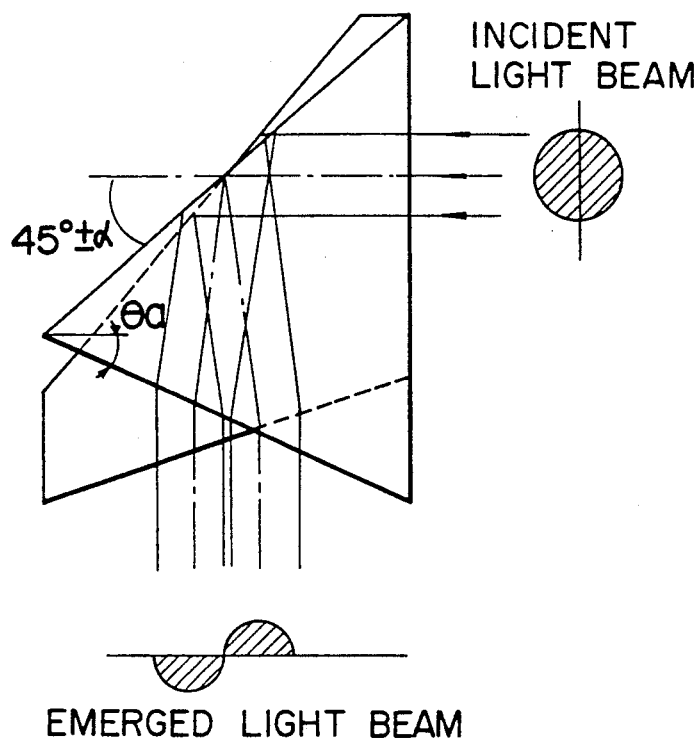
F I G. 29A
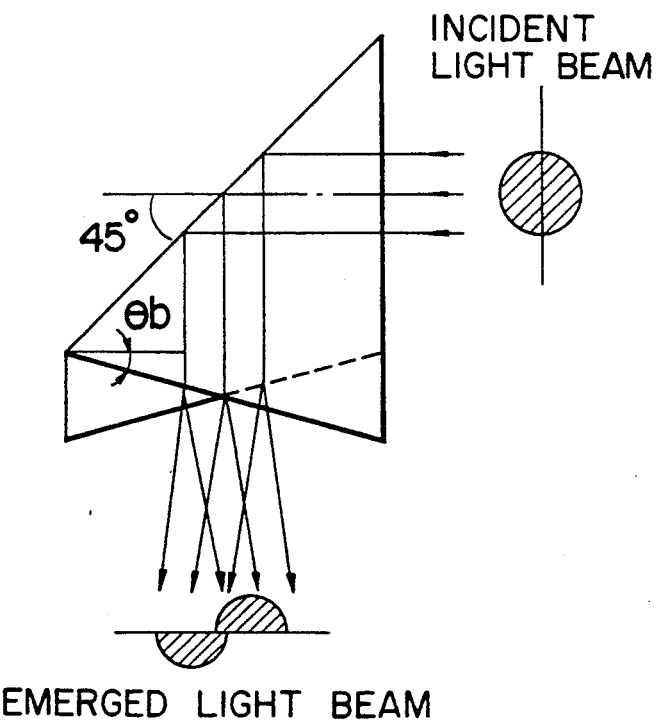
F I G. 30

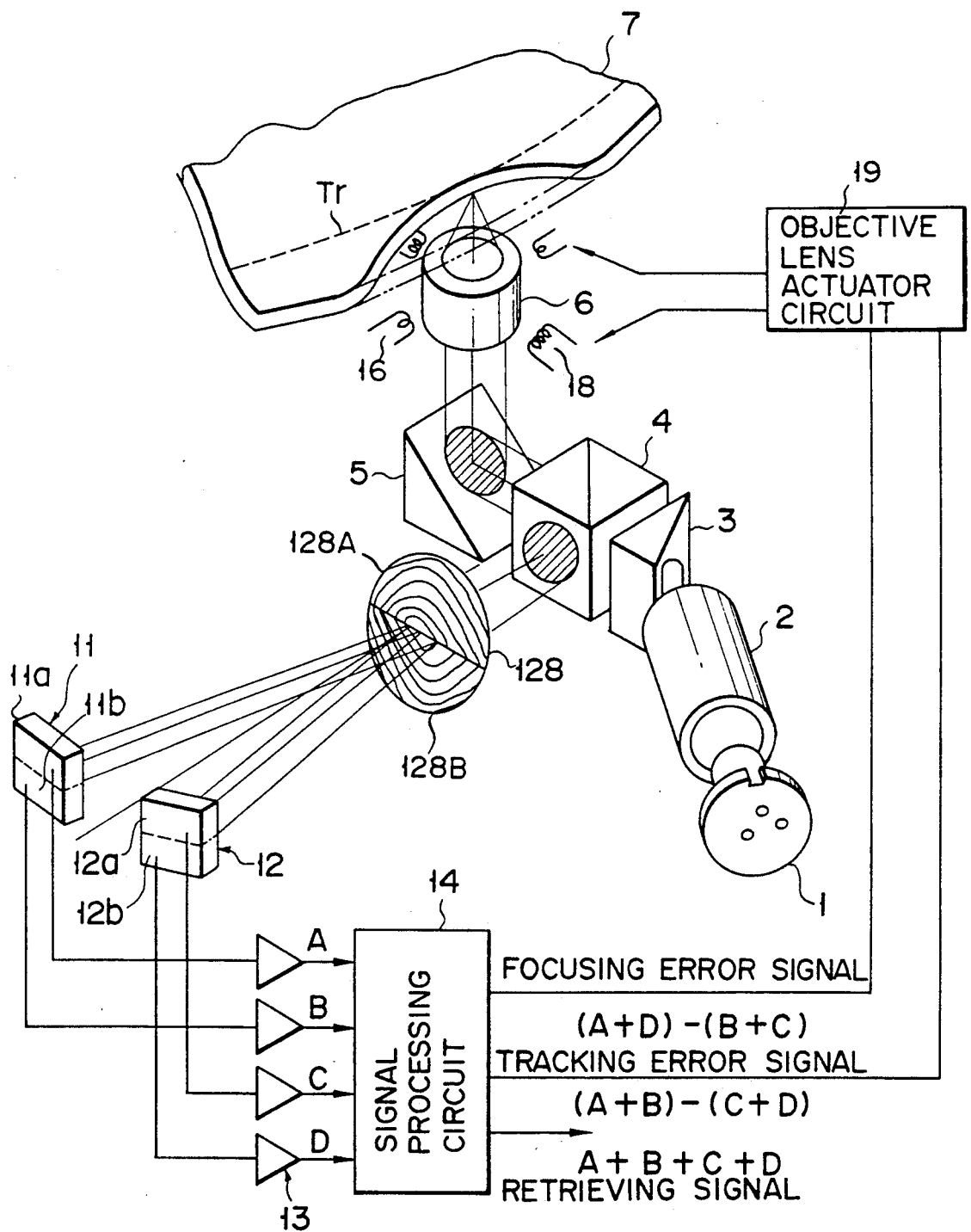
F I G. 31

FOCUSING ERROR DETECTING APPARATUS

BACKGROUND OF THE INVENTION

1. Field of the Invention

The present invention relates to an apparatus for detecting a focusing error, and more particularly, to a focusing error detecting apparatus for detecting a focusing error of an objective lens, with respect to the recording surface of an optical disk, which is incorporated in an optical disk apparatus for optical information reproduction.

2. Description of the Related Art

In optical disk apparatuses for reproducing from and recording information on, e.g., an optical disk, an objective lens, used to converge a light beam from a light source on the recording surface of the disk, must be kept focused so that the smallest beam spot is formed on the recording surface, during recording and/or retrieving operation. In consideration of this requirement, these optical disk apparatuses incorporate a focusing servo unit, which detects a focusing error of the objective lens with respect to the recording surface, and moves the objective lens in the direction of its optical axis in accordance the detected focusing error.

The double-knife-edge method, among many others, is conventionally known as a typical method of focusing error detection in the optical disk apparatuses.

FIG. 1 shows an arrangement of an optical system of a focusing error detecting apparatus which uses the double-knife-edge method. A light beam reflected from an optical disk (not shown in FIG. 1) passes through an objective lens (not shown) in the opposite direction to a light beam directed to the disk, and is separated from the beam bound for the disk by beam splitter 101. Then, the light beam is divided into two light beams by wedge prisms 102 and 103 (or split prism), and the split beams are converged, by converging lens 104, on detecting regions 105a, 105b, 106a and 106b of two photo-detectors 105 and 106, which are located in different positions.

FIGS. 2A to 2C show how the spot shapes of the light beams on detecting regions 105a, 105b, 106a and 106b of photodetectors 105 and 106 change, and FIG. 3 shows characteristic curves representing changes of a focusing error signal and a retrieving information signal with respect to a focusing error. If output signals corresponding to detecting regions 105a, 105b, 106a and 106b of photodetectors 105 and 106 are A, B, C and D, respectively, the focusing error signal, indicative of the focusing error of the objective lens, and the retrieving information signal, both produced by a processing circuit, are given by $\{[A+D]-[B+C]\}$ and $[A+B+C+D]$, respectively. According to the double-knife-edge method, as seen from these drawings, the level of the focusing error changes substantially near the focused point, and the sensitivity for focusing error detection is high.

In the conventional focusing error detecting apparatus, however, if the objective lens is kept focused so that the smallest spots are formed on the optical disk, very small circular spots are formed on the photodetectors, as shown in FIG. 2B, and most of beam is falls into non-detecting regions of photodetectors 105 and 106. In the focused state, therefore, the intensity of the light beams detected by means of photodetectors 105 and 106 is very low. Also, the width of the non-detecting region of each photodetector is relatively wide, and if most of the beam spots are formed within the non-detecting regions of photodetectors 105 and 106 the level of signals detected by the photodetectors vary considerably. As a result, the focusing error signal $\{[A+D]-[B+C]\}$ is extremely unstable. The level of the retrieving information signal $[A+B+C+D]$ is so low in the focused state, moreover, that the signal-to-noise ratio of the retrieving information signal is not satisfactory.

The shape of the spot shown in FIGS. 2A to 2C is very sensitively changed depending on the focusing error so that the range of focusing error detection is very narrow. Therefore, it is difficult property to cope with a substantial focusing error which may be caused when the objective lens is withdrawn in the initial stage of focusing servo operation, or in normal recording and/or reproducing operation.

In the focusing error detecting apparatus based on the conventional double-knife-edge method, as described above, the intensity of the light beam detected by each photodetector in the focused state is reduced depending on the width of the non-detecting region of the photodetector. Thus, steady focusing error detection cannot be easily effected, the retrieving information signal cannot enjoy a satisfactory signal-to-noise ratio, and the range of focusing error detection is narrow.

SUMMARY OF THE INVENTION

The object of the present invention is to provide a focusing error detecting apparatus in which the level of detection signal from photodetectors is high enough even when an objective lens is kept focused, and the range of focusing error detection is wide.

According to the present invention, there is provided a focusing error detecting apparatus for detecting a focusing error of an objective lens with respect to a recording surface of optical memory, the objective lens converging a light beam emitted from a light source on the recording surface, which comprises: optical means for converging the light beam reflected by recording surface in a first direction, giving the light beam a directional aberration in a second direction perpendicular to the first direction, and dividing the light beam into first and second light beams, based on a reference division line extending in the second direction; detecting means including a first detecting region for detecting the first light beam, the first detecting region being divided into two detecting portions by a non-detecting region extending along the reference division line, so that first and second detection signals are generated individually from the detecting portions of the first detecting region; and processing means for processing the first and second detection signals and generating a focusing error signal corresponding to the focusing error of the objective lens.

According to the present invention, moreover, there is provided a focusing error detecting apparatus for detecting a focusing error of an objective lens with respect to a recording surface of optical memory, the objective lens converging a light beam emitted from a light source on the recording surface, which comprises: converging means for converging the light beam from the object surface in a first direction; dividing and aberration giving means for dividing the light beam into first and second light beams, based on a reference division line extending in a second direction perpendicular to the first direction, and giving the light beam a directional aberration in the second direction; detecting means including first and second detecting regions corresponding to the first and second light beams, respectively, and adapted to detect the first and second light beams, each of the first and second detecting regions being divided into two detecting portions by a non-detecting region extending along the reference division line, so that first, second, third, and fourth detection signals are generated individually from the detecting portions of the first and second detecting regions; and processing means for processing the first, second, third, and fourth detection signals and generating a focusing error signal corresponding to the focusing error of the objective lens.

According to the present invention, moreover, there is provided a focusing error detecting apparatus for detecting a focusing error of an objective lens with respect to a recording surface of optical memory, the objective lens converging a light beam emitted from a light source on the recording surface, which comprises: converging and aberration giving means for converging the light beam from the recording surface in a first direction and giving the light beam a directional aberration in a second direction perpendicular to the first direction; dividing means for dividing the light beam into first and second light beams, based on a reference division line extending in the second direction; detecting means including first and second detecting regions corresponding to the first and second light beams, respectively, and adapted to detect the first and second light beams from the dividing means, each of the first and second detecting regions being divided into two detecting portions by a non-detecting region extending along the reference division line, so that first, second, third, and fourth detection signals are generated individually from the detecting region portions of the first and second detecting regions; and processing means for processing the first, second, third, and fourth detection signals and generating a focusing error signal corresponding to the focusing error of the objective lens.

According to the present invention, furthermore, there is provided a focusing error detecting apparatus for detecting a focusing error of an objective lens with respect to a recording surface of optical memory, the objective lens converging a light beam emitted from a light source on the recording surface, which comprises: converging means for converging the light beam from the object surface in a first direction; dividing means for dividing the light beam into first and second light beams, based on a reference division line extending in a second direction perpendicular to the first direction; aberration giving means for giving the light beam a directional aberration in the second direction; detecting means including first and second detecting regions corresponding to the first and second light beams, respectively, and adapted to detect the first and second light beams transmitted through the converging means, the dividing means, and the aberration giving means, each of the first and second detecting regions being divided into two detecting region portions by a non-detecting region extending along the reference division line, so that first, second, third, and fourth detection signals are generated individually from the detecting region portions of the first and second detecting regions; and processing means for processing the first, second, third, and fourth detection signals and generating a focusing error signal corresponding to the focusing error of the objective lens.

According to the present invention, moreover, there is provided an apparatus for optically reproducing information from an optical memory, which comprises: a light source for emitting a light beam; an objective lens having an optical axis, supported for movement along the optical axis, and adapted to converge the light beam emitted from the light source, whereby the smallest spot is formed on the recording surface by focused light beam by means of the objective lens when the objective lens is kept focused, and a beam spot greater than the smallest beam spot is formed on the recording surface the objective lens is defocused; optical means for converging the light beam from the recording surface in a first direction, giving the light beam a directional aberration in a second direction perpendicular to the first direction, and dividing the light beam into first and second light beams, based on a reference division line extending in the second direction; detecting means including first and second detecting regions corresponding to the first and second light beams, respectively, and adapted to detect the first and second light beams, each of the first and second detecting regions being divided into two detecting region portions by a non-detecting region extending along the reference division line, so that first, second, third, and fourth detection signals are generated individually from the detecting region portions of the first and second detecting regions; processing means for processing the first, second, third, and fourth detection signals and generating a focusing error signal corresponding to the focusing error of the objective lens; and objective lens actuating means adapted to move the objective lens along the optical axis in response to the focusing error signal, thereby correcting the focusing error of the objective lens to keep the objective lens focused.

BRIEF DESCRIPTION OF THE DRAWINGS

FIGS. 2A to 2C show changes of the shapes of light beam spots formed on photodetectors of the apparatus of FIG. 1, with respect to a focusing error, in which FIG. 2B shows the spots obtained when an objective lens is kept focused, and FIGS. 2A and 2C show the spots obtained when the objective lens is moved from the focused position toward an optical disk and away from the disk, respectively;

FIG. 8 is a schematic view of an optical system of a focusing error detecting apparatus according to a second embodiment of the invention;

FIG. 9 is a perspective view of an optical element of a graded-index type shown in FIG. 8;

FIG. 10 is a plan view showing an arrangement of an integral photodetector shown in FIG. 8;

FIG. 11 is a schematic view of an optical system of a focusing error detecting apparatus according to a third embodiment of the invention;

FIG. 12 is a plan view showing an arrangement of a photodetector unit shown in FIG. 11;

FIG. 13 shows an outline of a focusing error detecting apparatus according to a fourth embodiment of the invention;

FIG. 14 is a schematic view of an optical system of a focusing error detecting apparatus according to a fifth embodiment of the invention;

FIG. 15 is an exploded perspective view showing an arrangement of a holographic optical element shown in FIG. 14;

FIGS. 16A and 16B show changes of the cross-sectional shapes of light beams transmitted through the holographic optical element shown in FIG. 14;

FIG. 17 is a schematic view of an optical system of a focusing error detecting apparatus according to a sixth embodiment of the invention;

FIG. 18 is a perspective view of a conical lens applicable to the optical system of FIG. 17;

FIG. 19 is a perspective view of a double-wedge prism applicable to the optical system of FIG. 17;

FIGS. 20 and 21 are schematic views showing optical elements applicable to the optical system of FIG. 17;

FIGS. 23A, 23B and 24 to 27 are schematic views showing modifications of the optical system of FIG. 17;

FIG. 28 is a schematic view of an optical system of a focusing error detecting apparatus according to a seventh embodiment of the invention;

FIG. 29A is a sectional view of a compound prism shown in FIG. 28;

FIG. 30 is a sectional view of a compound prism of a different shape as an example for comparison with the compound prism of FIG. 29;

FIG. 31 is a schematic view of an optical system of a focusing error detecting apparatus according to an eighth embodiment of the invention.

DETAILED DESCRIPTION OF THE PREFERRED EMBODIMENTS

Preferred embodiments of the present invention will now be described in detail with reference to the accompanying drawings.

Figure 4:
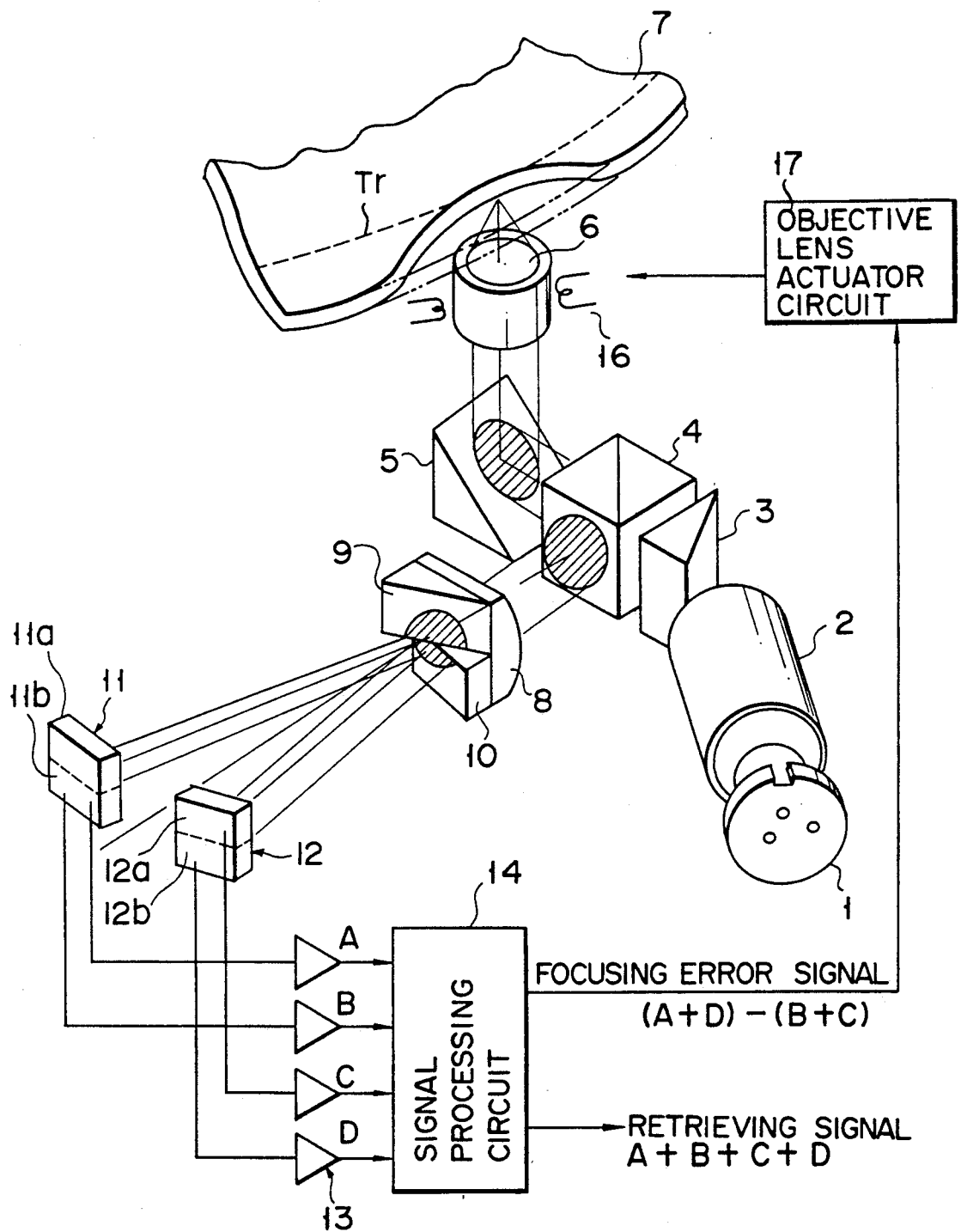
FIG. 4 shows an outline of a focusing error detecting apparatus according to a first embodiment of the present invention.

FIG. 4 shows an outline of a focusing error detecting apparatus according to a first embodiment of the present invention. In the apparatus shown in FIG. 4, a light beam from light source 1, e.g., a semiconductor laser, is collimated by means of collimating lens 2, and the collimated beam is incident on beam splitter 4 after being shaped by means of beam shaping prism 3. After being transmitted through beam splitter 4, the light beam is guided to objective lens 6 by mirror 5, whereupon it is converged in the form of a fine spot on the recording surface of optical disk 7 by objective lens 6.

Objective lens 6, which is supported so as to be movable along its optical axis by means of suspension (not shown in FIG. 4), is moved in the direction of the optical axis by a driving current applied to focusing coil 16. When lens 6 is kept focused, a smallest spot of the light beam directed from lens 6 to optical disk 7 is formed on disk 7. If lens 6 is moved from the focused position toward disk 7 or away from the disk 7, a spot greater than the smallest spot is formed on the recording surface of optical disk 7.

The reflected light beam from the recording surface of optical disk 7 passes objective lens 6 and is reflected by mirror 5 in the opposite direction to the beam directed to disk 7, and is reflected by beam splitter 4. Thereupon, the light beam is incident on the convex side of cylindrical lens 8, for use as first unidirectional converging to be converged only in one direction.

As shown in FIG. 4, first and second triangular prisms 9 and 10 are bonded to an emergence-side flat surface of cylindrical lens 8. They adjoin each other on a division line which extends at right angles to the converging direction of lens 8. The respective emergence surfaces of prisms 9 and 10 are inclined at a predetermined angle to that surface perpendicular to the optical axis, and they are directed symmetrically. The reflected light beam converged by lens 8 is divided into two substantially semicircular light beams, along the division line perpendicular to the converging direction of lens 8 by triangular prisms 9 and 10, and the split beams are directed differently by refraction. The respective two light beams are subjected to opposite direction aberration by prisms 9 and 10.

First and second photodetectors 11 and 12 serve to detect the light beams emerging from prisms 9 and 10, respectively. Photodetectors 11 and 12 have a pair of detecting regions 11a and 11b and a pair of detecting regions 12a and 12b, respectively. Each pair of detecting regions is divided by a non-detecting region which extends parallel to the adjacent edge of the emergence surfaces of prisms 9 and 10.

Output signals from photodetectors 11 and 12 are applied to processing circuit 14 after being amplified by means of amplifier 13. Circuit 14 is composed of an adders and a subtractor. If output signals corresponding to detecting regions 11a and 11b of first photo-detector 11 and detecting regions 12a and 12b of second photo-detector 12 are A, B, C and D, respectively, processing circuit 14 produces a focusing error signal based on an operation $\{[A+D]-[B+C]\}$ and a retrieving information signal based on an operation $[A+B+C+D]$. The focusing error signal is supplied to objective actuator circuit 17. In response to the focusing error signal, a driving current is supplied from driver circuit 17 to focusing coil 16, which causes objective lens 6 to move in the direction of its optical axis. Thus, a focusing error of lens 6 is corrected so that lens 6 is kept focused. The retrieving information signal is supplied to a processing circuit (not shown).

Figure 5A:
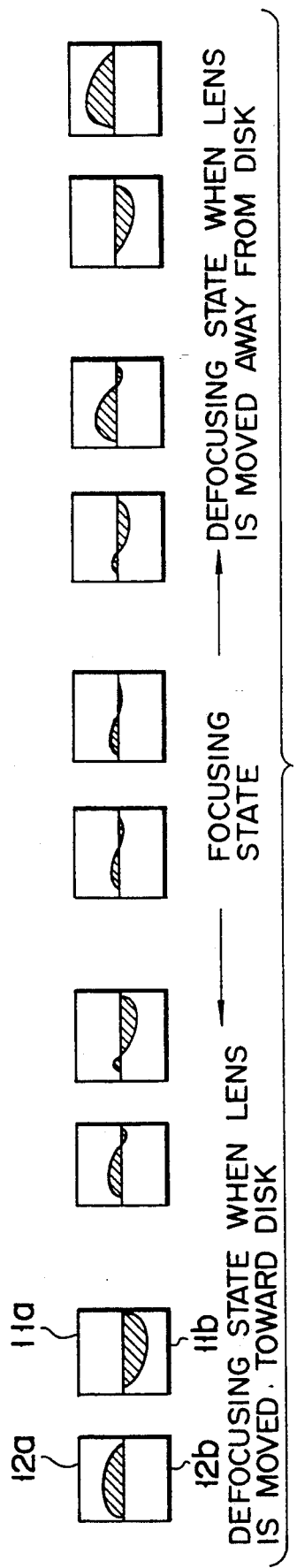
FIGS. 5A and 5B show changes of the images of light beams formed on photodetectors with respect to focusing errors in the apparatus of FIG. 4.
Figure 5B:
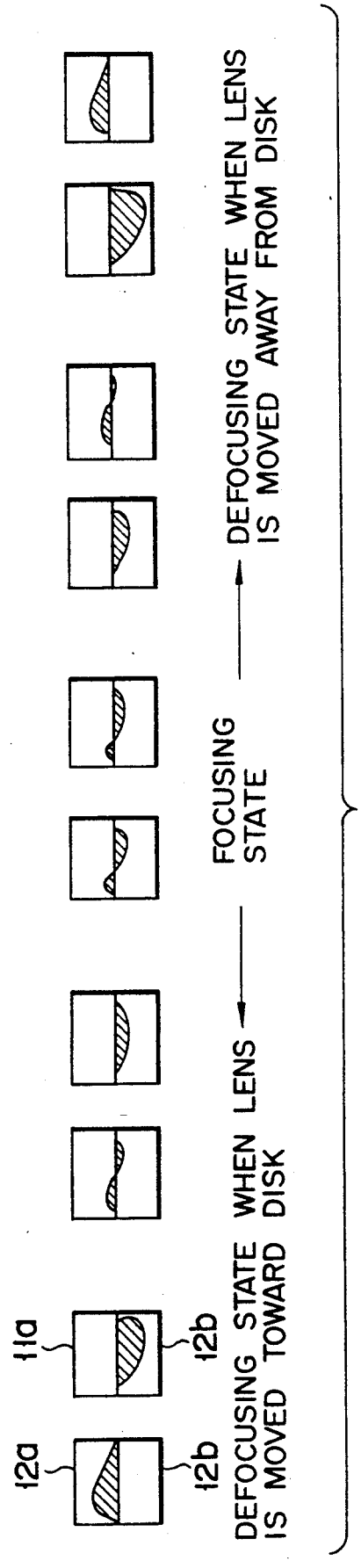

FIGS. 5A and 5B show how the states of the light beams incident upon detecting regions 11a, 11b, 12a and 12b of photodetectors 11 and 12 change corresponding to errors in the focus position of objective lens 6, with respect to the recording surface of optical disk 7. Images formed on regions 11a, 11b, 12a and 12b are asymmetric with respect to the non-detecting region which divides the detecting regions. Even in a focused state such that the focusing error is zero, the images cover relatively wide areas on the photodetectors, and the detection signal level is higher than that obtained with use of the conventional double-knife-edge method.

Thus, according to the optical system shown in FIG. 4, the level of a detection signal from each detecting region can be raised, so that the level of the retrieving information signal can be raised, and a stable focusing error signal can be produced.

Figure 6:
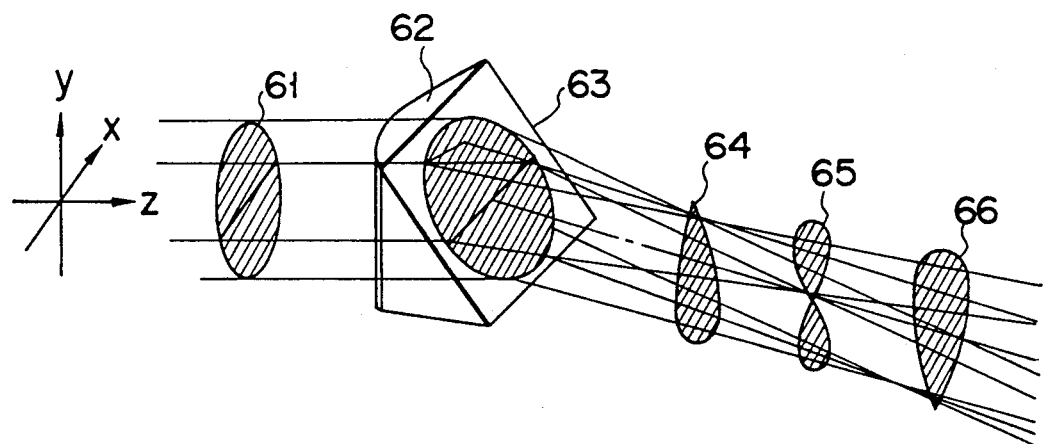
FIG. 6 is a schematic view of an optical system for illustrating the principle of detection of a focusing error detecting method used in the apparatus of FIG. 4.

Referring now to FIG. 6, there will be described the principle on which the images of the light beams shown in FIGS. 5A an 5B are formed on photodetectors 11 and 12 If circular incident beam 61 successively passes through cylindrical lens 62 and triangular prism 63, as shown in FIG. 6, it forms a focal line on a plane in detection area. When the beam is incident upon triangular prism 63, the optical path of each light ray of the light beam in prism 63 varies depending on the y-axis position. Elongated sectional portions of the light beams, each passing through fine belt-shaped regions extending in the x-direction in the cross section plane of the incident beam 61, form convergent points at different positions along the optical axis (z-axis), depending on the y-axis positions of the belt-shaped regions corresponding to the incident beams 61. Thus, the cross-sectional shape of the light beam within a plane perpendicular to the optical axis varies as indicated by numerals 64, 65 and 66, depending on the position on the optical axis. In other words, if a photodetector is placed in a fixed position behind triangular prism 63, the image of the light beams on the detecting regions of the photodetector varies with a focusing error. In this specification, the convergent point on which the focal line is crossed with the optical axis is defined as a reference convergent point in the optical system. The elongated sectional portion of the light beam, which passes through the fine belt-shaped region extending in the x-direction and arranged in the optical axis, is converged on the reference convergent point.

The arrangement of the optical system shown in FIG. 4 can be obtained by halving triangular prism 63 in the direction perpendicular to converging direction of cylindrical lens 62, that is, along the direction parallel to the generating line of cylindrical surface, so that the respective emergence surfaces of the halves are inclined opposite to each other with respect to the plane perpendicular to the optical axis. According to the optical system shown in FIG. 4, the images of the light beams incident upon photodetectors 11 and 12 are continuously changed in accordance with focusing errors, as shown in FIGS. 5A and 5B, and cover relatively wide areas even in the focused state. Thus, detection signals of sufficiently high levels can be obtained from photodetectors 11 and 12.

If first and second photodetectors 11 and 12 are located on the each reference convergent points of their corresponding light beams in the focused state, that is, at the positions on the optical axis such that the light beams detected in detecting regions 11a, 11b, 12a and 12b are substantially equal in intensity, the images of the beams incident upon photodetectors 11 and 12 change in the manner shown in FIG. 5A. In contrast with this, if the two photodetectors are deviated forward and rearward, individually, from the center convergent positions on the optical axis, the images of the beams incident upon photodetectors 11 and 12 change in the manner shown in FIG. 5B. As seen from FIG. 5B, compared with FIG. 5A, the image area in the focused state is larger, in particular, and that portion of the images formed on the non-detecting region is smaller, so that the detection level of the photodetectors is higher.

Figure 1:
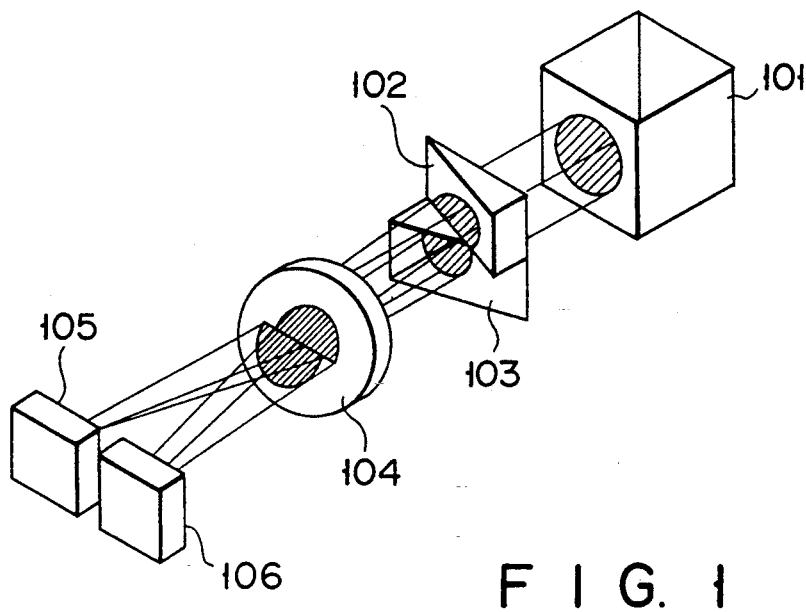
FIG. 1 is a schematic view for illustrating an outline of a focusing error detecting apparatus using the conventional double-knife-edge method.
Figure 2A:
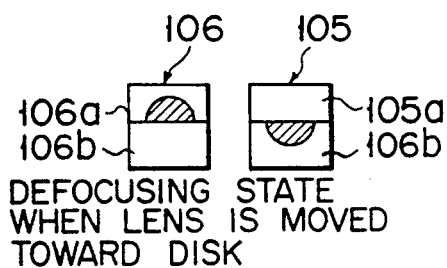
Figure 2B:
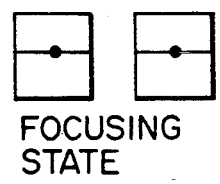
Figure 2C:
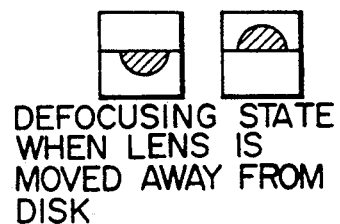
Figure 3:
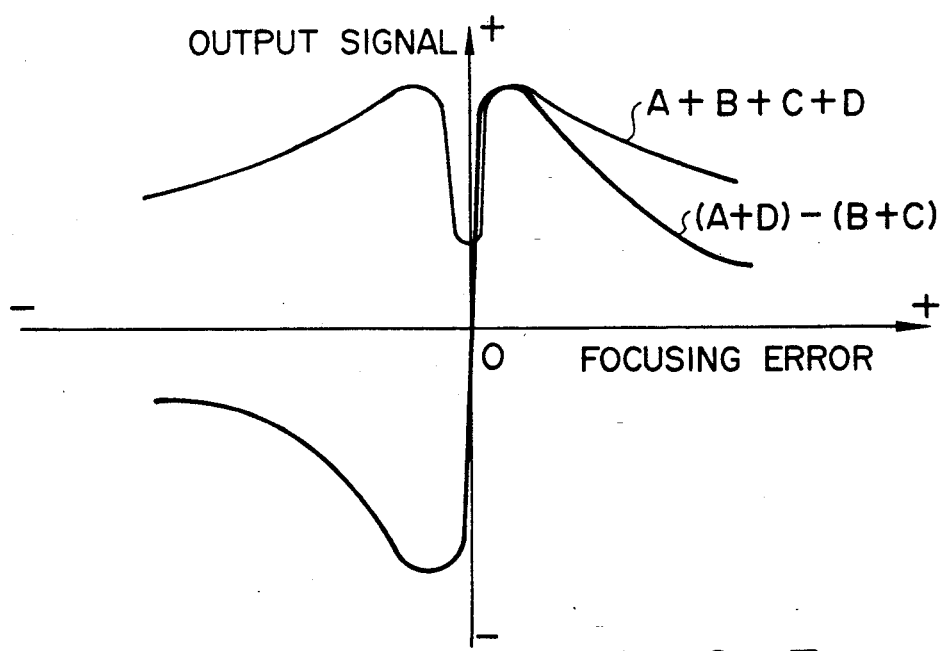
FIG. 3 shows characteristic curves representing changes of a focusing error signal and a retrieving information signal with respect to a focusing error in the apparatus of FIG. 1.
Figure 7:
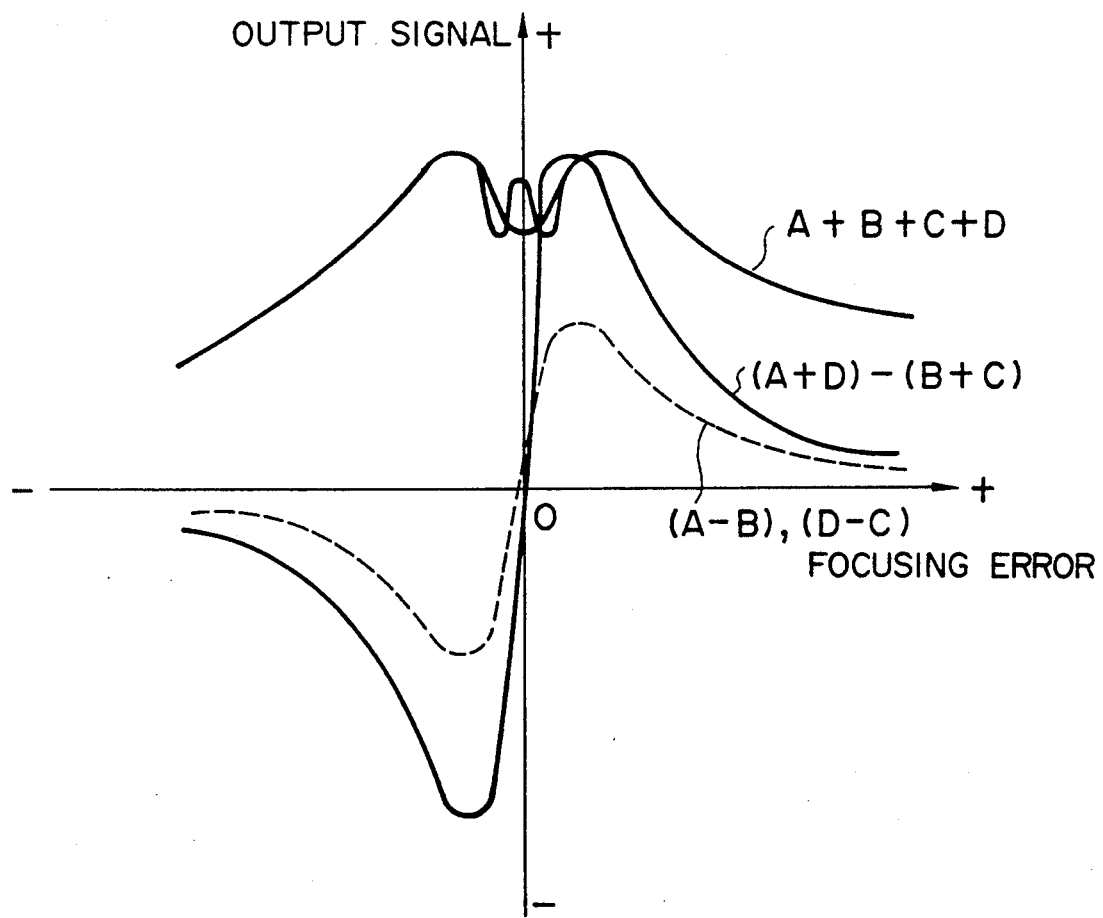
FIG. 7 shows characteristic curves representing changes of a focusing error signal and a retrieving information signal with respect to a focusing error in the apparatus of FIG. 4.

FIG. 7 shows characteristic curves representing the output signals from processing circuit 14 shown in FIG. 4. The range within which the focusing error signal $\{[A+D]-[B+C]\}$. indicates a substantially straight change with respect to the focusing error, that is, the focusing error detection range, is wider than that for the conventional double-knife-edge method shown in FIG. 3. As the signal level from photodetectors 11 and 12 in the focused state rises, the level of the retrieving information signal $[A+B+C+D]$ also rises.

Referring now to FIGS. 8 to 35, alternative embodiments of the present invention will be described. FIG. 8 shows an optical system according to a second embodiment of the invention. In FIG. 8, only those portions which are different from their counterparts of the first embodiment are illustrated. A reflected light beam from the recording surface of optical disk 7, guided by beam splitter 4, is divided into two light beams by wedge prism 21, and the split beams are incident upon the convex surface side of cylindrical lens 22. Optical element 23 of a graded-index type is disposed on the flat surface side of lens 22.

As shown in FIG. 9, optical element 23 is composed of portions 23a and 23b in which first and second refractive indexes are distributed, respectively. Portions 23a and 23b are divided along a division line (broken line) which extends at right angles to the converging direction of cylindrical lens 22, that is, parallel to the generating line of cylindrical surface. The respective refractive indexes of distribution portions 23a and 23b graded in opposite directions along the division line of optical element 23. Incident light beams which are divided by wedge prism 21 and converged by cylindrical lens 22. Those light beams indexes are graded. In other words, the light beams pass through it with different optical path lengths. Thus, the light beams transmitted through graded-index portions 23a and 23b, like the ones transmitted through prisms 9 and 10 shown in FIG. 4, are subjected to aberration. The light beams emerging from refractive-index-distribution optical element 23 are detected by means of first and second photodetectors 25 and 26 in photodetector unit 24, which correspond to distribution portions 23a and 23b, respectively, are arranged so that the division lines between their detecting regions extend parallel to each other, as shown in FIG. 10. According to the optical system shown in FIGS. 8 to 10, light beam spots similar to the ones shown in FIG. 5A are formed on photodetector 24.

FIG. 11 shows an optical system of a focusing error detecting apparatus according to a third embodiment of the present invention. In this optical system, second cylindrical lens 31 for converging light beams is disposed in succession to first and second triangular prisms 9 and 10 used in the first embodiment. Lens 31, which is located so that its generating line extends at right angles to that of first cylindrical lens 8, converging the light beams in a second direction perpendicular to the converging direction of lens 8.

Cylindrical lens 31 serves to reduce the angle of the two light beams therefrom. Thus, photodetector unit 32 may used as the photodetector in which first and second two-segment photodetectors 33 and 34 are arranged so that division lines between their detecting regions are in alignment with each other, as shown in FIG. 12. In this case, the detecting region plane are arranged at right angles to the advancing direction of the light beams incident upon triangular prisms 9 and 10. Thus, optical system can be made compact, and the size of the optical head is reduced.

FIG. 13 shows an optical system of a focusing error detecting apparatus according to a fourth embodiment of the present invention. Objective lens 6 of finite conjugate is used in this optical system. With use of the objective lens of finite conjugate, a reflected light beam from the recording surface of optical disk 7 can be converted into a convergent light beam. Thus, the optical system of FIG. 11 is equivalent to the system of the third embodiment. In this case, a photodetector unit similar to the one shown in FIG. 12 can be used as photodetector 44.

FIG. 14 shows an optical system of a focusing error detecting apparatus according to a fifth embodiment of the present invention. In the optical system shown in FIG. 14, one holographic optical element 51 serves for all of first means for a light beam in one direction, dividing means for dividing the light beam, and deflecting means for deflecting the light beam. As shown in FIG. 15, element 51 is composed of regions 51a and 51b, which give the light beam an aberration such that the beam is converged only in one direction and the focal line is inclined, and regions 51c and 51d which divide the light beam in two. Also in this optical system, a photodetector unit similar to the one shown in FIG. 12 is used as photodetector 52. As shown in FIGS. 16A and 16B, the light beam emerging from holographic optical element 51 of the optical system shown in FIG. 14 changes its cross-sectional shape as it advances.

According to this fifth embodiment, the optical system for focusing error detection can be made more compact, so that the size of optical head can be further reduced.

FIG. 17 shows an optical system of a focusing error detecting apparatus according to a sixth embodiment of the present invention. In the optical system shown in FIG. 17, a light beam reflected by the recording surface of optical disk 7 passes objective lens 6 and reflected by mirror 5 to be incident upon beam splitter 4, and is then incident on cylindrical lens 8 which is inclined at an angle to the optical axis. The light beam is convergent in one direction by lens 8. Since lens 8 is tilted, the light beam is subjected to aberration, and its focal line is inclined. After being transmitted through cylindrical lens 8, the light beam is incident on Foucaut prism 109 which is located so that its ridge extends at right angles to the converging direction of lens 8. Thereupon, the light beam is divided on either side of the ridge as a division line, and deflected in two directions.

The light beams are incident upon first and second two-segment photodetectors 11 and 12. The detecting region of each photodetector is divided in two along a detecting region division line (broken line) which is substantially coincident with an image of the ridge o prism 109. The resulting detecting regions are designated by 11a, 11b, 12a and 12b, individually. Images of light beam, such as the ones shown in FIG. 5A or 5B, are formed on photodetectors 11 and 12. Thus, a focusing error signal and an retrieving information signal are produced by processing output signals from photodetectors 11 and 12 by means of processing circuit 14.

In the optical system shown in FIG. 17, the ridge of Foucault prism 109 is set so as to extend parallel to an image of a concentric or spiral groove on optical disk 7, that is, track Tr including a tracking guide or a pit array. Accordingly, patterns or images, as dark regions corresponding to the tracking guide, are formed on either or both of the images on photodetectors 11 and 12 by diffraction caused when the light beams are reflected by the tracking guide. In a focused state such that the track is traced by the light beams, dark portions of equal areas are formed on photodetectors 11 and 12. If the light beams are deviated from the track, dark portions are formed on either of photodetectors 1 and 12. Thus, signals from photodetectors 11 and 12 are added to provide addition signals [A+B] and [C+D], and a tracking error signal is obtained from the difference {[A+B]−[C+D] between the addition signals. In response to this tracking signal, a driving current is supplied from lens actuator driver circuit to tracking coil 18. Tracking coil 18 causes objective lens 6 to move at right angles to its optical axis, so that the objective lens is kept in an on-track state.

Figure 22:
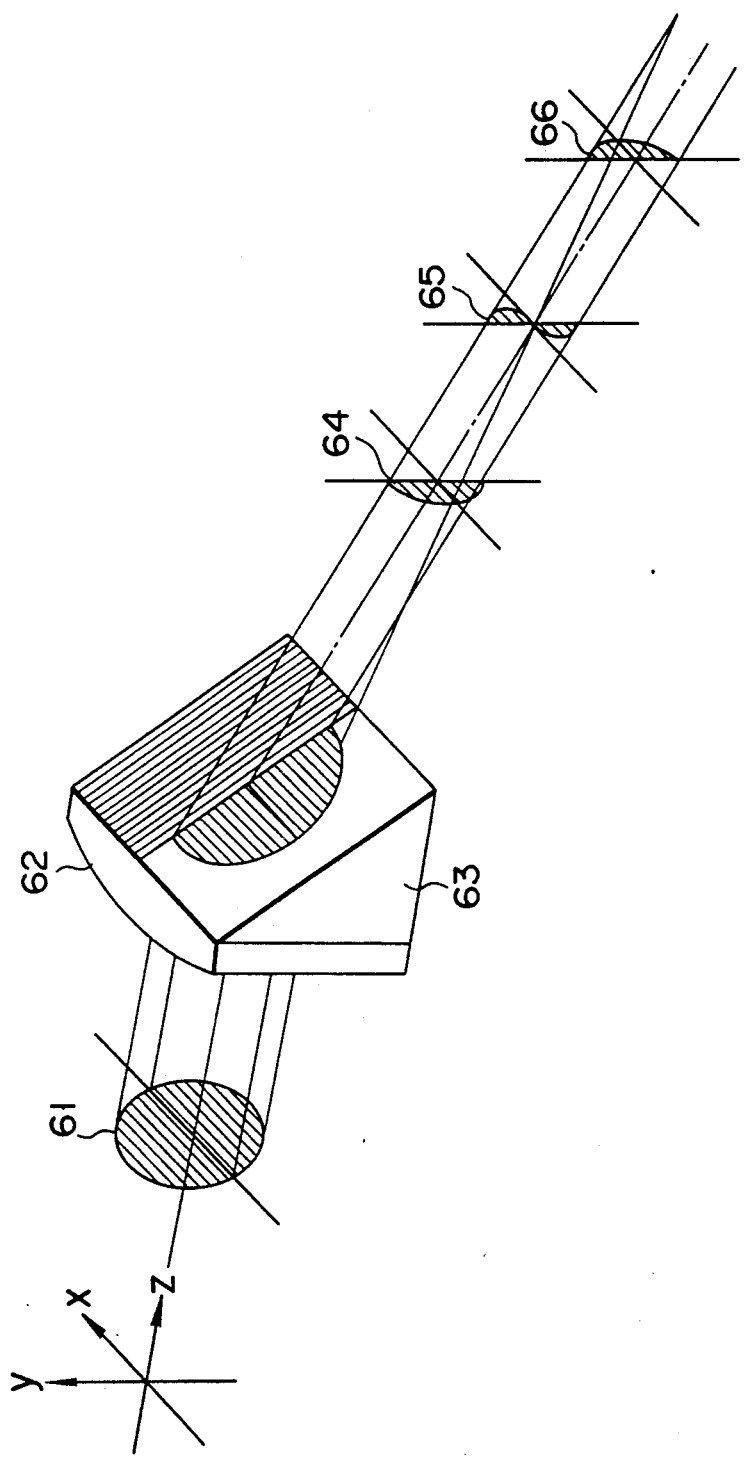
FIG. 22 is a schematic view showing optical system according to the modification of the invention.

In the optical system shown in FIG. 17, moreover, tilted cylindrical lens 8 is used as the means for converging the light beams in one direction and subjecting the light beams to aberration. Alternatively, element 110, such as a conical lens, having a surface, e.g., a conical surface, whose curvature continuously varies in one direction, as shown in FIG. 18, may be used for the purpose. In the arrangement described above, furthermore, Foucault prism 109 is used as the beam dividing means. It may be replaced with double-wedge prism 115, as shown in 19, or optical element 116 having two cylindrical surfaces used to condense the light beams in different directions, as shown in FIG. 20, or reflecting mirror 117 situated so as to divide the light beam in two, as shown in FIG. 21. If only one of the split beams is necessary, the dividing means may be formed of a knife edge or a shield layer as shown in FIG. 22. A detection system according to the present invention may be constructed using any combination of these elements or an integrated element incorporating the same.

FIGS. 23A, 23B and 24 to 27 show modifications of the optical system shown in FIG. 17. In the optical system shown in FIG. 23A, a reflected light beam from the recording surface of optical disk 7, guided by beam splitter 4 is incident upon optical element 118 which has a conical first surface and a second surface formed of two cylindrical surfaces. In element 118, the light beam is converged in one direction by the first surface. As it advances through optical element 118, the light beam is subjected to a directional aberration in the direction perpendicular to the converging direction. In element 118, moreover, two images are formed on different points by the respective lens effects of the two cylindrical surfaces of the second surface. The distance between the two images can be adjusted as required, depending on the configuration of the second surface, and the two images are detected by means of photodetector unit 24.

In the optical system shown in FIG. 23B, optical element 119 has a cylindrical first surface and a second surface formed of two conical surfaces. Thus, a light beam is converging in one direction by the first surface, and then converging in the same direction by the two conical surfaces of the second surface. Also, the light beam is subjected to a directional aberration, in the direction perpendicular to the converging direction of element 119, and are divided, by the conical surfaces.

In the optical system shown in FIG. 24, conical lens 110 is combined with knife edge 120. In this arrangement, a light beam is converged in one direction by a conical first surface of optical element 110. As it advances through this optical element, the light beam is subjected to a directional aberration in the direction perpendicular to the converging direction of element 110. Part of the light beam emerging from a flat second surface of optical element 110 is intercepted by means of knife edge 120, while the remainder is directed to photodetector 11. Thus, the light beam is divided in two by knife edge 120. In this modification, the efficiency of utilization of the light beam is not very high, since one of the split light beams is not detected. However, if reflecting mirror 117 is used in place of knife edge 120, as shown in FIG. 25, the efficiency of utilization is not reduced. In the optical system shown in FIG. 25, a cylindrical lens 8 is disposed at an angle to the optical axis thereof so that a light beam is converged in one direction and subjected to aberration.

In the optical system shown in FIG. 26, conical lens 110, which converges a light beam in one direction and gives aberration to the beam, is used with Foucault prism 109 which is used to divide the light beam from lens 110. In consideration of availability, double-wedge prism 115, as well as Foucault prism 109, can be effectively used as the means for dividing the light beam. In the optical system shown in FIG. 27, conical lens 110, which converges a light beam in one direction and gives aberration to the beam, is used with double-wedge prism 15 which is used to divide the light beam from lens 110.

As is evident from the above description, in the optical systems shown in FIGS. 17, 23A, 23B and 24 to 27, conical optical elements 8, 110, 118 and 119 for converging the light beam in one direction and/or optical elements 109, 120, 117 and 115 for dividing the light beam may be replaced with holographic optical element 21 shown in FIGS. 14 and 15.

FIG. 28 shows a focusing error detecting apparatus according to a seventh embodiment of the present invention.

In the optical system shown in FIG. 28, a light beam emerging from cylindrical lens 8 is divided into two light beams by compound prism 9, and is subjected to aberration in the direction along a beam division line. A second surface of prism 9 is formed of two reflecting surfaces which have different angles of reflection so that the light beam is divided in two at the division line perpendicular to the converging direction of lens 8. Thus, the reflected light beam from the second surface of compound prism 9 is divided into two semicircular light beams which are guided in different directions. A third surface of prism 9 is formed of two emergence surfaces inclined symmetrically with respect to the advancing directions of the two light beams. The two light beams emerging from prism 9 are subjected to opposite directional aberrations along the beam division line.

The two light beams emerging from compound prism 9 are converged in the direction perpendicular to the direction of converging beam at first lens 8, by cylindrical lens 120, for use as a second lens for converging the light beams, and are incident upon photodetector 32, which has two sets of two-segment detecting regions. Each detecting surface of photodetector 32 is divided in two along a detecting surface division line which is substantially coincident with an image of the division line provided by compound prism 9. The resulting detecting regions are designated by 32a, 32b, 32c and 32d, individually. Images of light beam spots, such as the ones shown in FIG. 5A or 5B, are formed on photodetector 32, as mentioned before. As in the cases of the foregoing embodiments, output signals from photodetector 32 are processed by means of processing circuit 14, to be produced into a focusing error signal, tracking error signal, and retrieving information signal.

The function of compound prism 9 will be described in brief.

FIG. 29A shows a typical configuration of compound prism 9 shown in FIG. 28, and FIG. 30 shows, for reference, a configuration of a prism whose reflecting surface is not divided. In either case, the angle of incidence of the light beams upon the emergence surface of the prism is fixed, and the same amount of aberration along the light beam division line, apply to the light beams emerging from the prism.

Figure 29B:
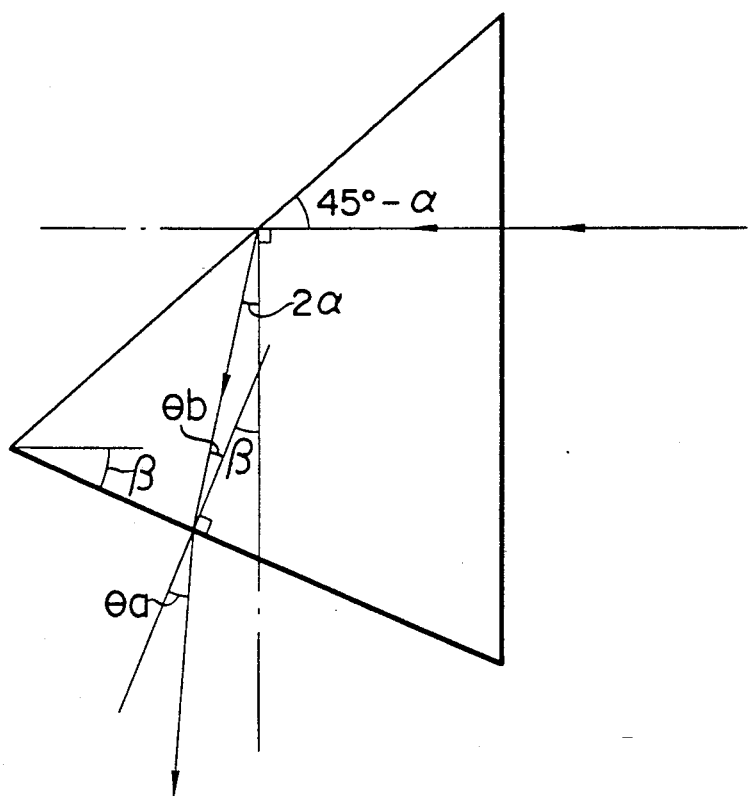
FIG. 29B shows one of the compound prism shown in FIG. 29A.
Figure 32:
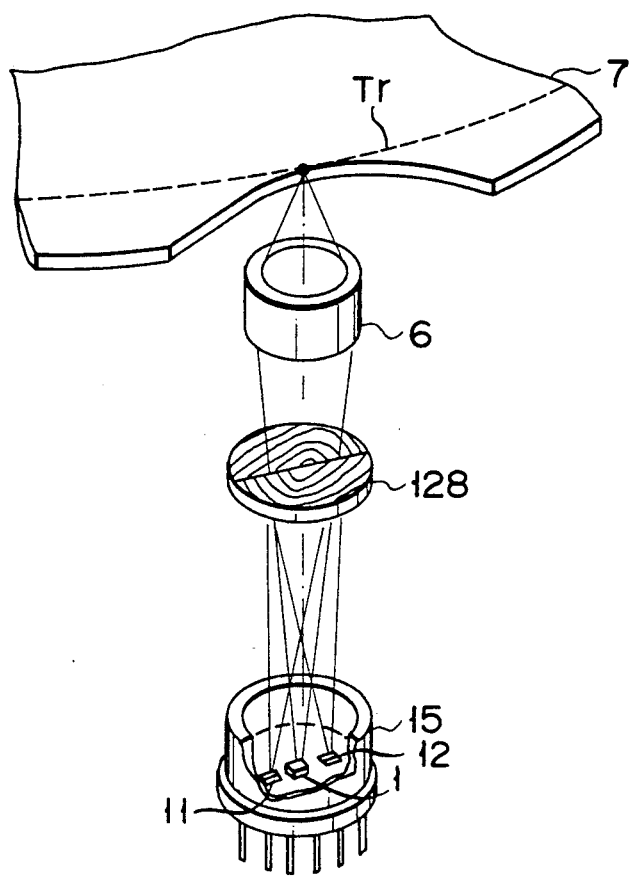
FIGS. 32 to 35 show modifications of the arrangement of the optical system shown in FIG. 31.

FIG. 29B shows a prism corresponding to one of the compound prisms shown in FIG. 29A. In the prism shown in FIG. 29B, if the incident angle and the emerging angle at which the light beam is incident on and emerges from the light beam emerging surface of the prism are $\theta b$, and $\theta a$, respectively, the angle of deviation from 45° to the reflection surface of the prism is $\alpha$, the inclination angle of the light beam emerging surface is $\beta$, and the refractive index of the prism is n, then we have $$\theta b = \beta - 2\alpha \tag{1}$$

$$\sin\theta a = n\sin\theta b = n\sin[\beta - 2\alpha] \tag{2}$$

The condition of causing the emerging light beam reflected from the reflection surface to guide along the optical axis requires $\beta = \theta a$.

Following equation is established from the equation (2).

$$\sin\beta = n\sin[\beta - 2\alpha].$$

Thus, $$\tan\beta = \frac{\sin 2\alpha}{\cos 2\alpha - 1/n} \tag{3}$$

If the prism is shaped so as to fulfill the requirements of equations, the respective optical axes of the two light beams emerging from the prism are parallel to each other, and the light beams are converged on the same position on the focus of cylindrical lens 120 as shown in FIG. 29A. Thus, the detection by means of the single packaged photodetector can be effected by varying $\alpha$ or $\beta$ slightly (3) so that the two light beams divided on the surface of photodetector 32 are separated wide enough from each other for separate detection. Since the optical axis of the light beam incident upon cylindrical lens 120 is inclined slightly to that of lens 120, moreover, the light beam can be converged by lens 120 without disturbing the aberration provided by compound prism 9.

Cylindrical lens 8 and compound prism 9 may be formed in one element from plastic material in order to reduce the material cost and the number of assembling processes.

In the optical system shown in FIG. 28, moreover, the cylindrical lens is used as the second lens. Alternatively, a spherical lens may be used with the same result. Although the focusing error is detected by processing the detection signal from the two photodetector, furthermore, it may be also detected from the detection signal [A−B] or [D−C] of one detector, as shown in FIG. 7.

FIG. 31 shows an optical system of a focusing error detecting apparatus according to an eighth embodiment of the present invention. In the optical system shown in FIG. 31, a light beam reflected by the recording surface of optical disk 7 passes objective lens 6 and is reflected by mirror 5 to be incident upon beam splitter 4, whereupon it is reflected by splitter 4 to be incident upon holographic optical element 128 which has a predetermined function. Element 128 is composed of two portions 128A and 128B, which adjoin each other on a straight boundary edge. Portions 128A and 128B have a wave-front conversion function such that images are formed at a predetermined distance on detecting surfaces so that the width of each spot, with respect to the direction perpendicular to the boundary line, continuously varies along the boundary line, based on an image of the boundary line as an axis. First and second two-segment photodetectors 11 and 12 are disposed for light beams emerging from holographic optical element 128. Each of photodetectors 11 and 12 is divided in two along a detecting surface division line, which is substantially coincident with the image of the boundary line of the holographic optical element.

Output signals from two-segment photodetectors 11 and 12 are applied to computing circuit 14 after being amplified to a suitable level by means of amplifier 13. If output signals corresponding to detecting regions 11a and 11b of first photodetector 11 and detecting regions 12a and 12b of second photodetector 12 are A, B, C and D, respectively, computing circuit 14 produces a focusing error signal based on an operation $\{[A+D]-[B+C]\}$ and information signal based on an operation $[A+B+C+D]$. If the detection optical system is oriented in the manner shown in FIG. 31, with respect to a train of information signals, a tracking error signal is obtained according to an operation $\{[A+B]-[C+D]\}$.

Holographic optical element 128 is shaped so that it can enjoy a function to convert the wave front of plane waves, as in the foregoing embodiments in which the cylindrical lens and triangular prisms are combined. Alternatively, the configuration of element 128 may be determined as follows. The phase transmission function $\phi(x, y)$ of the holographic optical element is defined as $$\phi(x,y)=(\lambda/2\pi)\Sigma\Sigma C_{pq}X^p Y_q$$

where $\lambda$ and $(x, y)$ are the wavelength of the light beam and coordinates of the XY-plane on holographic optical element, respectively, and $C_{pq}$ is determined by ray-tracing at some sampling points so that desired images can be obtained in detecting area. In this case, designing the images in detection area directly leads to the design of the detection characteristics, thus improving the design efficiency of the detection system.

According to the optical system described above, images, such as the ones shown in FIG. 5A or 5B, are formed on photodetectors 11 and 12, and signals shown in FIG. 7 are produced by computing circuit 14.

The optical system can be further reduced in size by using the holographic optical element. FIGS. 32 to 35 show modifications of the optical system shown in FIG. 31. In the optical system shown in FIG. 32, holographic optical element 128 is used in an optical head with finite conjugate objective lens 6. According to the optical system of this type, integrated element 15 can be used which includes a semiconductor laser, for use as light source 1, and photodetectors 11 and 12, packaged together. Thus, the optical head can be reduced in size.

Figure 33:
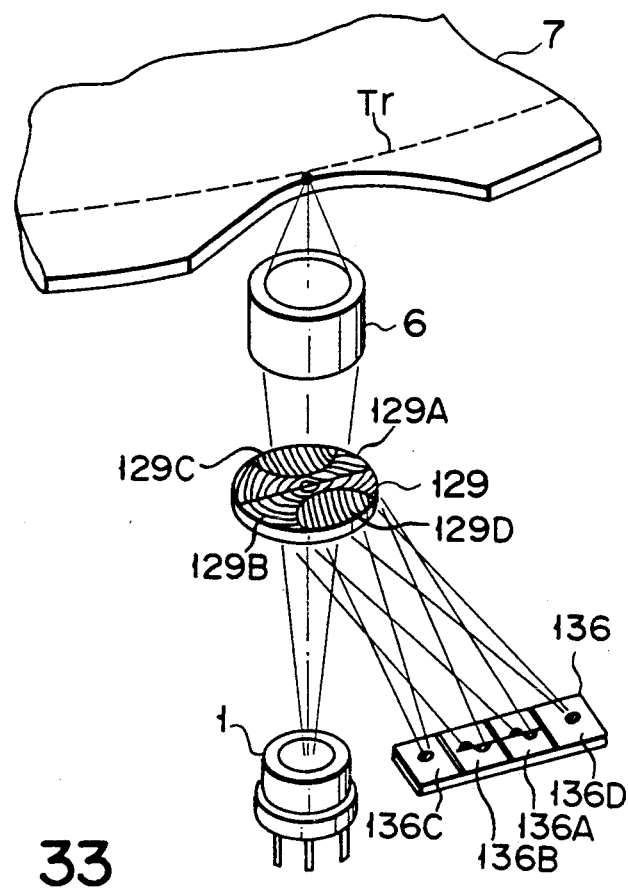

In the optical system shown in FIG. 33, holographic optical element 129, which detects a focusing error by using part of a light beam from optical disk 7, is divided into two regions, with respect to the extending direction of an image of tracking guide Tr, and each of the half regions is further divided into two regions for focusing and tracking detection. Thus, element 129 is formed of four regions 129A, 129B, 129C and 129D. In this optical system, the light beam incident upon holographic optical element 129 is converged by the lens effect of element 129, an is divided into four light beams by the four regions. The light beams from regions 129C and 129D, whose intensity varies most sharply due to the influence of a tracking error, are directed to detecting regions 136C and 136D, respectively, of photodetector 136, and a detection signal is detected and tracking error signal is produced. The light beams from regions 129A and 129B are detected by detecting regions 136A and 136B, respectively, of photodetector 136, and are converted into a focusing error signal. According to the optical system constructed in this manner, the optical head can be reduced in size. Also, the light beams used to detect the focusing signal can be separated from the light beams used to detect the tracking signal, so that a crosstalk between the focusing and tracking signals can be restrained.

Figure 34:
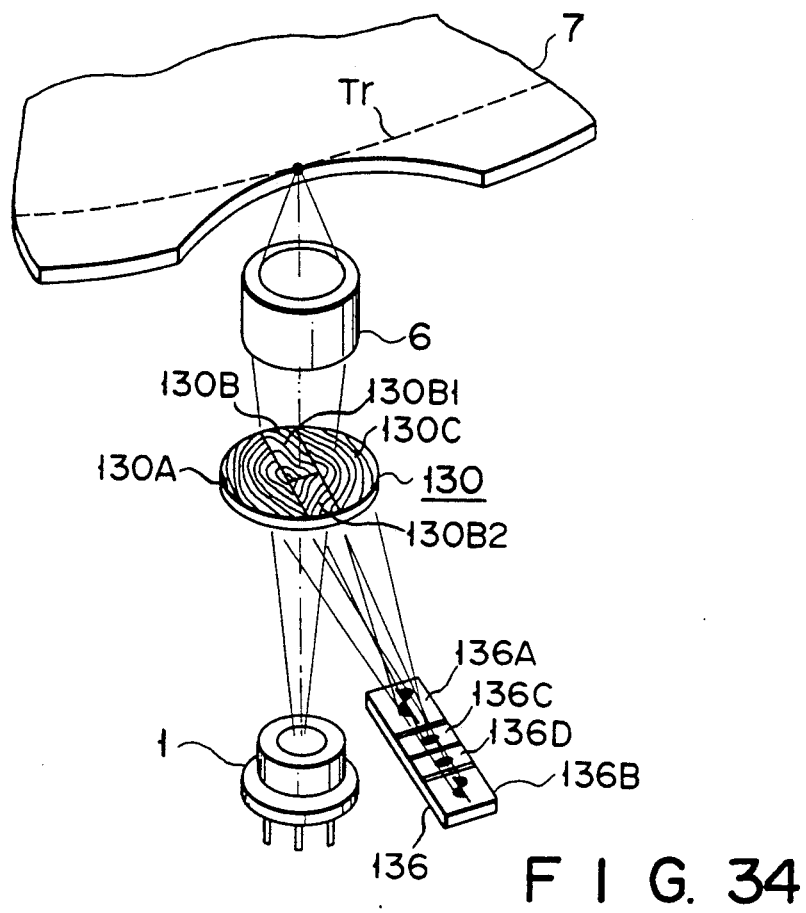

In the optical system shown in FIG. 34, holographic optical element 130 is constructed differently from holographic optical element 129 shown in FIG. 33. More specifically, element 130 is first divided into three regions 130A, 130B and 130C by means of division lines which extend at right angles to the extending direction of an image of tracking guide Tr. Region 130B between regions 130A and 130C is further divided into two regions 130B1 and 130B2 by means of a division line which extends in the extending direction of the image of tracking guide Tr. Light beams from central regions 130B1 and 130B2 of element 130 are directed to and detected by detecting regions 136C and 136D of photodetector 136, and the resulting detection signals are processed and a tracking error signal is generated. Light beams from outside regions 130A and 130C of element 130 are incident upon detecting regions 136A and 136B of photodetector 136, and the resulting detection signals are processed and focusing error signal is generated. According to the optical system constructed in this manner, an optical head can be reduced in size. Also, the optical system for detecting a focusing error is an off-axis optical system, and the intensity distribution of light beam spots is away from the division lines of the photodetector, so that only very small portions of the light beams fall on nondetecting surface of photodetector 136, and fail to be received by the sensitive regions.

Figure 35:
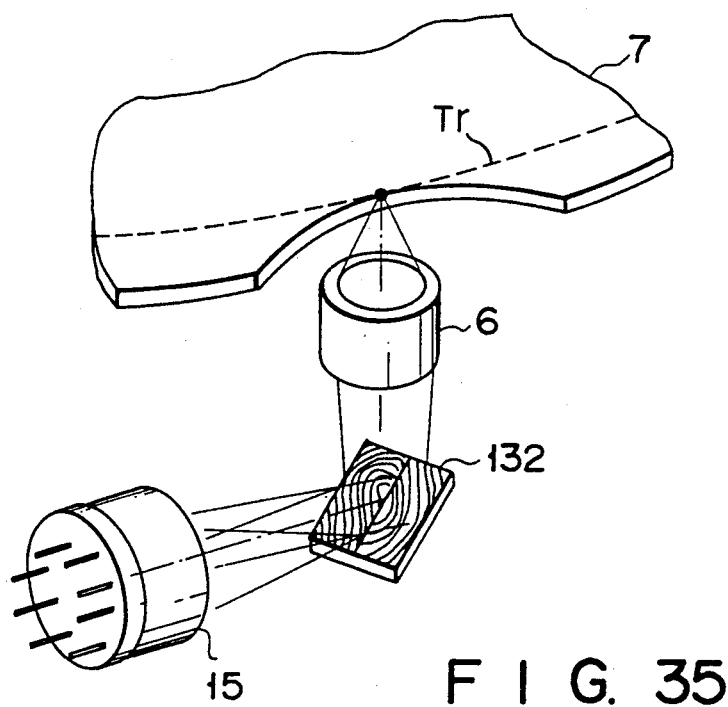

In the optical system shown in FIG. 35, a detection system is constructed using reflection-type holographic optical element 132 as a holographic optical element for converging a light beam and subjecting the beam to aberration. This optical system has an advantage that an optical head can be reduced in size in direction perpendicular to the surface of an optical disk.

According to the present invention, as described above, there may be provided a focusing error detecting apparatus, in which the quantity of light incident upon the photodetector is large in the focused state, so that stable focusing error detection can be effected for a misalignment or tracking error of the optical system, and the range of focusing error detection can be set as widely as needed, despite the limited size of the optical system.

According to the present invention, moreover, there may be provided a focusing error detecting apparatus, in which the signal-to-noise ratio of the information signal can be increased, and the range of focusing error detection can be set as widely as needed, so that the objective lens can be easily withdrawn in the initial stage of focusing servo operation, and even a great focusing error can be detected.

It is to be understood, moreover, that the present invention is not limited to the embodiments described above, and that various changes and modifications may be effected therein by one skilled in the art without departing from the scope or spirit of the invention

What is claimed is:

1. A focusing error detecting apparatus for detecting a focusing error of an objective lens with respect to an object surface, said objective lens converging a light beam emitted from a light source on the object surface, comprising:

optical means for converging the light beam reflected from the object surface in a first direction, giving the light beam a directional aberration in a second direction perpendicular to the first direction, and dividing the light beam into first and second light beams, based on a reference division line extending- in the second direction;

detecting means for generating detection signals based on the first and second light beams, including a first detecting region for detecting the first light beam from the optical means said first detecting region being divided into two detecting region portions by a non-detecting region extending along the reference division line, so that first and second detection signals are generated individually from the detecting region portions of the first detecting region; and processing means for processing the first and second detection signals and generating a focusing error signal corresponding to the focusing error of the objective lens.

2. The focusing error detecting apparatus according to claim 1, wherein said optical means includes a lens for converging the light beam in the first direction and a pair of refractors joined along the reference division line and adapted to divide the light beam and give aberration to the light beam.

3. The focusing error detecting apparatus according to claim 2, wherein said pair of refractors are formed of prisms having their respective emergence surfaces facing in different directions.

4. The focusing error detecting apparatus according to claim 1, wherein said optical means includes a lens for converging the light beam in the first direction, a first refractor having first and second emergence surfaces divided along the reference division line and adapted to divide the light beam, and a pair of second refractors for giving aberration to the light beam, the refractive indexes of said second refractors continuously varying in opposite directions along the second direction.

5. The focusing error detecting apparatus according to claim 1, wherein said optical means includes a lens for converging the light beam in the first direction and a pair of refractors joined along the reference division line and adapted to divide the light beam, said lens being inclined at an angle to the optical axis so that aberration is given to the light beam.

6. The focusing error detecting apparatus according to claim 1, wherein said optical means includes a lens for converging the light beam in the first direction and giving different optical path lengths to the light beams.

7. The focusing error detecting apparatus according to claim 1, wherein said optical means includes a pair of surfaces from which the two light beams emerge in different direction, said surfaces adjoining along the second direction.

8. The focusing error detecting apparatus according to claim 1, wherein said optical means includes a pair of concave surfaces from which the light beams emerge in different direction, said concave surfaces adjoining along the second direction.

9. The focusing error detecting apparatus according to claim 1, wherein said optical means includes a holographic optical element.

10. The focusing error detecting apparatus according to claim 1, further comprising a lens disposed between said optical means and said detection area and adapted to converge the light beam in the second direction.

11. The focusing error detecting apparatus according to claim 1, further comprising shading means for shielding the second light beam.

12. The focusing error detecting apparatus according to claim 1, wherein said detecting means further includes a second detecting region for detecting the second light beam, said second detecting region being region being divided into two second detecting region portions by a non-detecting region extending along the reference division line, so that third and fourth detection signals are generated individually from the second detecting region portions of the second detecting region, and said processing means processes the first, second, third, and fourth detection signals and generates the focusing error signal corresponding to the focusing error of the objective lens.

13. The focusing error detecting apparatus according to claim 12, wherein said optical means converges said first and second light beams, and said first detecting region of said detecting means is disposed between the optical means and a first convergent point, out of first and second convergent points of the first and second light beams from the optical means, said second convergent point being located between the second detecting region and said optical means.

14. The focusing error detecting apparatus according to claim 12, wherein said processing means adds the first and third detection signals, thereby producing a first addition signal, adds the second and fourth detection signals, thereby producing a second addition signal, and delivers the difference between the first and second addition signals as a focusing error signal.

15. The focusing error detecting apparatus according to claim 14, wherein said first and second detecting regions of said detecting means are arranged so that the first and second detection signals generated from the detecting region portions of the first detecting region are equal and that the third and fourth detection signals generated from the second detecting region portions of the second detecting region are equal, when the focusing error signal is at a desired level.

16. A focusing error detecting apparatus for detecting a focusing error of an objective lens with respect to an object surface, said objective lens converging a light beam emitted from a light source on the object surface, comprising:

converging means for converging the light beam reflected from the object surface in a first direction;

dividing and aberration giving means for dividing the light beam into first and second light beams, based on a reference division line extending in a second direction perpendicular to the first direction, and giving the light beam a directional aberration in the second direction;

detecting means including first and second detecting regions corresponding to the first and second light beams, respectively, and adapted to detect the first and second light beams transmitted through the converging means and the dividing and aberration giving means, each of said first and second detecting regions being divided into two detecting region portions by a non-detecting region extending along the reference division line, so that first, second, third, and fourth detection signals are generated individually from the detecting region portions of the first and second detecting regions; and processing means for processing the first, second, third, and fourth detection signals and generating a focusing error signal corresponding to the focusing error of the objective lens.

17. The focusing error detecting apparatus according to claim 16, wherein said converging means includes a lens for converging the light beam in the first direction.

18. The focusing error detecting apparatus according to claim 16, wherein said dividing means includes a pair of refractors joined along the reference division line and adapted to divide the light beam.

19. The focusing error detecting apparatus according to claim 18, wherein said pair of refractors are formed of prisms having their respective emergence surfaces facing in different directions.

20. The focusing error detecting apparatus according to claim 16, wherein said converging means includes a holographic optical element.

21. The focusing error detecting apparatus according to claim 16, further comprising a lens disposed between said optical means and said detecting area and adapted to converge the light beam in the second direction.

22. The focusing error detecting apparatus according to claim 16, wherein said optical means converges said first and second light beams, and said first detecting region of said detecting means is disposed between the optical means and a first convergent point, out of first and second convergent points of the first and second light beams from the optical means, said second convergent point being located between the optical means and the second detecting region.

23. The focusing error detecting apparatus according to claim 16, wherein said processing means adds the first and third detection signals, thereby producing a first addition signal, adds the second and fourth detection signals, thereby producing a second addition signal, and delivers the difference between the first and second addition signals as a focusing error signal.

24. The focusing error detecting apparatus according to claim 23, wherein said first and second detecting regions of said detecting means are arranged so that the first and second detection signals generated from the detecting region portions of the first detecting region are equal and that the third and fourth detection signals generated from the second detecting region portions of the second detecting region are equal, when the focusing error signal is at a desired level.

25. A focusing error detecting apparatus for detecting a focusing error of an objective lens with respect to an object surface, said objective lens converging a light beam emitted from a light source on the object surface, comprising:

converging and aberration giving means for converging the light beam reflected from the object surface in a first direction and giving the light beam a directional aberration in a second direction perpendicular to the first direction;

dividing means for dividing the light beam into first and second light beams, based on a reference division line extending in the second direction;

detecting means including first and second detecting regions corresponding to the first and second light beams, respectively, and adapted to detect the first and second light beams from the dividing means, each of said first and second detecting regions being divided into two detecting region portions by a nondetecting region extending along the reference division line, so that first, second, third, and fourth detection signals are generated individually from the detecting region portions of the first and second detecting regions; and processing means for processing the first, second, third, and fourth detection signals and generating a focusing error signal corresponding to the focusing error of the objective lens.

26. The focusing error detecting apparatus according to claim 25, wherein said converging means includes a lens for converging the light beam in the first direction.

27. The focusing error detecting apparatus according to claim 25, wherein said dividing means includes a pair of refractors joined along the reference division line and adapted to divide the light beam.

28. The focusing error detecting apparatus according to claim 25, wherein said pair of refractors are formed of prisms having their respective emergence surfaces facing in different directions.

29. The focusing error detecting apparatus according to claim 25, wherein said converging and aberration giving means includes a lens for converging the light beam in the first direction and a pair of refractors joined along the reference division line and adapted to divide the light beam, said lens being inclined at an angle to an optical axis incident thereon so that said directional aberration is given to the light beam.

30. The focusing error detecting apparatus according to claim 25, wherein said converging means includes a lens for converging the light beam in the first direction and giving different optical path lengths to the light beams.

31. The focusing error detecting apparatus according to claim 26, wherein said lens has a pair of surfaces from which the light beams emerge in different directions, said surfaces adjoining along the second direction.

32. The focusing error detecting apparatus according to claim 26, wherein said lens has a pair of concave surfaces from which the light beams emerge in different directions, said concave surfaces adjoining along the second direction.

33. The focusing error detecting apparatus according to claim 25, wherein said converging means includes a holographic optical element.

34. The focusing error detecting apparatus according to claim 25, further comprising a lens disposed between said optical means and said detecting means and adapted to converge the light beam in the second direction.

35. The focusing error detecting apparatus according to claim 25, wherein said optical means converges said first and second light beams, and said first detecting region of said detecting means is disposed between the optical means and a first convergent point, out of first and second convergent points of the first and second light beams from the optical means, said second convergent point being located between the second detecting region and the optical means.

36. The focusing error detecting apparatus according to claim 25, wherein said processing means adds the first and third detection signals, thereby producing a first addition signal, adds the second and fourth detection signals, thereby producing a second addition signal, and delivers the difference between the first and second additional signals as a focusing error signal.

37. The focusing error detecting apparatus according to claim 36, wherein said first and second detecting regions of said detecting means are arranged so that the first and second detection signals generated from the detecting region portions of the first detecting region are equal and that the third and fourth detection signals generated from the second detecting region portions of the second detecting region are equal, when the focusing error signal is at a desired level.

38. An apparatus for optically reproducing information from an optical information recording medium, comprising:
   a light source for emitting a light beam;
   an objective lens having an optical axis, supported for movement along the optical axis, and adapted to converge the light beam emitted from the light source, whereby the smallest spot is formed on the recording surface by means of the convergent light beam from the objective lens when the objective lens is kept focused, and a beam spot greater than the smallest spot is formed on the recording surface by means of the convergent light beam from the objective lens when the objective lens is kept defocused so that the objective lens is subjected to a focusing error;
   optical means for converging the light beam from the recording surface in a first direction, giving the light beam a directional aberration in a second direction perpendicular to the first direction, and dividing the light beam into first and second light beams, based on a reference division line extending in the second direction;
   detecting means including first and second detecting regions corresponding to the first and second light beams, respectively, and adapted to detect the first and second light beams, each of said first and second detecting regions being divided into two detecting region portions by a non-detecting region extending along the reference division line, so that first, second, third, and fourth detection signals are generated individually from the detecting region portions of the first and second detecting regions;
   processing means for processing the first, second, third, and fourth detection signals and generating a focusing error signal corresponding to the focusing error of the objective lens; and
   objective lens driving means adapted to move the objective lens along the optical axis in response to the focusing error signal, thereby correcting the focusing error of the objective lens to keep the objective lens focused.

39. The apparatus according to claim 38, wherein said optical means includes a lens for converging the light beam in the first direction and a pair of refractors joined along the reference division line and adapted to divide the light beam and give aberration to the light beam.

40. The apparatus according to claim 38, wherein said pair of refractors are formed of prisms having their respective emergence surfaces facing in different directions.

41. The apparatus according to claim 38, wherein said optical means includes a lens for converging the light beam in the first direction, a first refractor having first and second emergence surfaces divided along the reference division line and adapted to divide the light beam, and a pair of second refractors for giving aberration to the light beam, the refractive indexes of said second refractors continuously varying in opposite directions along the second direction.

42. The apparatus according to claim 38, wherein said optical means includes a lens for converging the light beam in the first direction and a pair of refractors joined along the reference division line and adapted to divide the light beam, said lens being inclined at an angle to optical axis so that aberration is given to the light beam.

43. The apparatus according to claim 38, wherein said optical means includes a lens for converging the light beam in the first direction and giving different optical path lengths to the light beams.

44. The apparatus according to claim 38, wherein said lens has a pair of surfaces from which the light beams emerge in different directions, said surfaces adjoining along the second direction.

45. The apparatus according to claim 38, wherein said lens has a pair of concave surfaces from which the light beams emerge in different directions, said concave surfaces adjoining along the second direction.

46. The apparatus according to claim 38, wherein said optical means includes a holographic optical element.

47. The apparatus according to claim 38, further comprising a lens disposed between said optical means and said object surface and adapted to converge the light beam in the second direction.

48. The apparatus according to claim 38, wherein said optical means converges said first and second light beams, and said first detecting region of said detecting means is disposed between the optical means and a first convergent point, out of first and second convergent points of the first and second light beams from the optical means, said second convergent point being located between the second detecting region and the optical means. second detecting region and the optical means.

49. The apparatus according to claim 38, wherein said processing means adds the first and third detection signals, thereby producing a first addition signal, adds the second and fourth detection signals, thereby producing a second additional signal, and delivers the difference between the first and second addition signals as a focusing error signal.

50. The apparatus according to claim 49, wherein said first and second detecting regions of said detecting means are arranged so that the first and second detection signals generated from the detecting region portions of the first detecting region are equal and that the third and fourth detection signals generated from the second detecting region portions of the second detecting region are equal, when the focusing error signal is at a desired level.

* * * * *